US012676325B2

(12) United States Patent
Finnerty et al.

(10) Patent No.: US 12,676,325 B2
(45) Date of Patent: Jul. 7, 2026

(54) AFTERBURNERS INCLUDING METHODS OF MAKING AND OPERATING

(71) Applicant: WATT Fuel Cell Corp., Mount Pleasant, PA (US)

(72) Inventors: Caine Finnerty, Mount Pleasant, PA (US); Paul DeWald, Scottdale, PA (US)

(73) Assignee: WATT FUEL CELL CORP., Mount Pleasant, PA (US)

( * ) Notice: Subject to any disclaimer, the term of this patent is extended or adjusted under 35 U.S.C. 154(b) by 899 days.

(21) Appl. No.: 15/061,333

(22) Filed: Mar. 4, 2016

(65) Prior Publication Data

US 2016/0260990 A1 Sep. 8, 2016

Related U.S. Application Data

(60) Provisional application No. 62/128,725, filed on Mar. 5, 2015.

(51) Int. Cl.
| | |
|---|---|
| *H01M 8/04014* | (2016.01) |
| *F23C 13/02* | (2006.01) |
| *F23C 13/04* | (2006.01) |
| *F23D 14/62* | (2006.01) |
| *F23G 7/07* | (2006.01) |
| *H01M 8/0662* | (2016.01) |

(52) U.S. Cl.
CPC ......... *H01M 8/04022* (2013.01); *F23C 13/02* (2013.01); *F23C 13/04* (2013.01); *F23D 14/62* (2013.01); *F23G 7/07* (2013.01); *H01M 8/0662* (2013.01); *F23G 2209/14* (2013.01);

*H01M 2250/405* (2013.01); *Y02B 90/10* (2013.01); *Y02E 20/12* (2013.01)

(58) Field of Classification Search
CPC ............. H01M 8/0618; H01M 8/0662; H01M 8/04022; H01M 2250/405; F23C 13/02; F23C 13/04; F23D 14/62; F23G 2209/14; F23G 7/07; F01N 13/0097; Y02B 90/10; Y02E 20/12; Y02E 60/50
See application file for complete search history.

(56) References Cited

U.S. PATENT DOCUMENTS

| | | | |
|---|---|---|---|
| 3,208,131 A | 9/1965 | Ruff et al. | |
| 4,154,568 A | 5/1979 | Kendall et al. | |

(Continued)

FOREIGN PATENT DOCUMENTS

| | | |
|---|---|---|
| JP | S47-023609 U | 11/1972 |
| JP | S5024178 A | 3/1975 |

(Continued)

*Primary Examiner* — Miriam Stagg
*Assistant Examiner* — Lilia Nedialkova
(74) *Attorney, Agent, or Firm* — CANTOR COLBURN LLP

(57) ABSTRACT

The present teachings provide designs and materials of construction for afterburners as well as methods of making the afterburners. More specifically, the afterburners of the present teachings can include a compressible, resilient refractory material such that thermal expansion of other adjacent components, for example, a fuel cell stack of a fuel cell unit, can be accommodated by the afterburner. The present teachings also provide methods of reducing contaminants in exhaust streams and/or generating heat.

16 Claims, 6 Drawing Sheets

(56)          References Cited

U.S. PATENT DOCUMENTS

| | | | | |
|---|---|---|---|---|
| 4,491,640 | A * | 1/1985 | Sadamori | B01J 23/464 |
| | | | | 423/245.3 |
| 5,527,631 | A * | 6/1996 | Singh | H01M 8/0625 |
| | | | | 502/527.23 |
| 5,591,413 | A * | 1/1997 | Toyoda | B01J 35/04 |
| | | | | 422/171 |
| 6,124,054 | A * | 9/2000 | Gorman | H01M 8/0662 |
| | | | | 429/34 |
| 6,365,283 | B1 | 4/2002 | Brück | |
| 6,428,754 | B1 * | 8/2002 | Chang | B01D 53/9454 |
| | | | | 423/213.2 |
| 6,630,115 | B1 * | 10/2003 | Kaneeda | B01J 23/688 |
| | | | | 423/213.5 |
| 7,901,637 | B2 * | 3/2011 | Hemmatpour | B01J 35/0006 |
| | | | | 422/177 |
| 2004/0029057 | A1 | 2/2004 | Pettit | |
| 2004/0081871 | A1 | 4/2004 | Kearl et al. | |
| 2004/0258587 | A1 * | 12/2004 | Bowe | B01J 19/249 |
| | | | | 422/222 |
| 2007/0104622 | A1 * | 5/2007 | Zuberi | B01D 46/0012 |
| | | | | 422/177 |
| 2007/0264518 | A1 * | 11/2007 | Wolf | B01D 53/945 |
| | | | | 428/593 |
| 2007/0269691 | A1 * | 11/2007 | Ko | C01B 3/384 |
| | | | | 429/410 |
| 2009/0117421 | A1 * | 5/2009 | Yoshida | H01M 8/04373 |
| | | | | 429/415 |
| 2013/0101873 | A1 * | 4/2013 | Dionne | F01K 27/02 |
| | | | | 429/9 |
| 2013/0142725 | A1 * | 6/2013 | Brantley | H01M 8/0618 |
| | | | | 423/648.1 |
| 2015/0188173 | A1 * | 7/2015 | Hussaini | H01M 8/04097 |
| | | | | 429/410 |
| 2016/0237934 | A1 * | 8/2016 | Ohori | F02D 41/182 |

FOREIGN PATENT DOCUMENTS

| | | |
|---|---|---|
| JP | H06154622 A | 6/1994 |
| JP | 2002-089236 A | 3/2002 |
| JP | 2002-357120 A | 12/2002 |
| JP | 2007-521953 A | 8/2007 |
| JP | 2009-515097 A | 4/2009 |
| JP | 2009-129829 A | 6/2009 |
| JP | 2013-525948 A | 6/2013 |
| JP | 2013-255905 A | 12/2013 |
| RU | 2474929 C1 | 2/2013 |

* cited by examiner

0% - 25%
25% - 75%
75% - 100%
50% - 100%
10% - 35%
5% - 25%
0% - 15%
0% - 10%

AFTERBURNERS INCLUDING METHODS OF MAKING AND OPERATING

CROSS REFERENCE TO RELATED APPLICATIONS

This application claims priority to and the benefit of the filing date of U.S. Provisional Patent Application No. 62/128,725, filed on Mar. 5, 2015, the entire disclosure of which is incorporated by reference herein.

FIELD

The present teachings relate to afterburners for reducing contaminants in a fluid such as an exhaust stream. More particularly, the present teachings relate to afterburners including a compressible, resilient refractory material, which afterburners can be incorporated into a fuel cell unit to reduce contaminants irons a fuel cell stack or into a heater unit to generate heat.

BACKGROUND

Afterburners generally are used to reduce contaminants and undesirable components in exhaust streams from a variety of sources including engine exhaust streams and fuel cell exhaust streams.

Using a fuel cell as an example, two conventional approaches exist to treat exhaust from a fuel cell system such as a solid oxide fuel cell ("SOFC") system. The first approach is simple combustion. Such combustion can provide better heat transfer and a reduced amount of contaminants, but it can have a few disadvantages such as its flammability range (e.g., during start-up and shut-down), system stability, and emissions.

The second common approach uses catalytic combustion, which provides greater flexibility on start-up and shut-down and reduced emissions. In such an approach, a combustion catalyst typically is supported on a solid ceramic support such as a cordierite honeycomb, hut a metal substrate also can be the support. Ceramic-supported catalysts have several disadvantages. For example, the solid ceramic supports used in fuel cell "afterburners" can be brittle, can have low tolerance for thermal expansion, can have relatively high pressure drops, can require additional premixing of the spent fuel and cathode streams to avoid a phenomena referred to as channeling (where the combustion ratio of one honeycomb channel is substantially different from another honeycomb channel due to missing or poor flow distribution), and can have a relatively high thermal mass.

When these supports are integrated into a linear fuel cell stack design, the solid nature of the ceramic support combined with its brittleness can cause deleterious effects as the fuel cell stacks expand during the start-up of the fuel cell stack to its operational temperature. The ends of the fuel cell package can be effectively constrained, and where the fuel cell stacks have a higher thermal expansion than the refractory insulation and ceramic afterburner support, the components in the fuel cell stack and package are placed under additional stress, which can cause damage during repeated cycling.

Thus, there is a need to improve the design and construction of afterburners and methods of reducing contaminants in exhaust streams, for example, an exhaust stream from a fuel cell stack.

SUMMARY

In light of the foregoing, the present teachings provide afterburner designs and materials of construction that can address various deficiencies and/or shortcomings of the state-of-the-art, including those outlined above. The present teachings also provide methods of reducing contaminants in a fluid containing contaminants such as an exhaust stream as well as methods of making the afterburners.

More specifically, afterburners of the present teachings include a compressible, resilient refractory material such that thermal expansion of other adjacent components, for example, a fuel cell stack of a fuel cell unit, can be accommodated by the afterburner. That is, the compressible and resilient nature of the refractory material that forms at least part of the afterburner such as its base or inlet face or surface can reduce the aforementioned thermal-induced stresses as the fuel cell stack expands within a fuel cell package. The nature of the refractory material can also maintain an effective seal between the components as the fuel cell stack contracts within the fuel cell unit package thereby avoiding flow around. Consequently, these characteristics can reduce the probability of component failure during thermal cycling of a fuel cell unit. Moreover, the flexible nature of the refractory material can help to compensate for tolerance stack up in the fuel cell unit and/or fuel cell system construction process.

Furthermore, the construction of the afterburner in layers can permit customized non-linear channels through the slack of layers to assist in the thermal management of the combustion processes within the afterburner. That is, an afterburner includes non-linear or tortuous channels through the compressible, resilient refractory material, which channels can direct heat, for example, heat from combustion, to specific zones of the afterburner where the heat can be transferred to other components and/or structure, for example, to heat incoming cathode air and/or to initiate a catalytic combustion reaction within the non-linear channels away from an igniter.

More specifically, in a fuel cell system, one or more cathode air conduits can be present through the afterburner, where the heat from combustion within the afterburner can be directed by the non-linear channels to be in thermal communication with the cathode air conduits thereby to transfer the heat from combustion to the incoming cathode air. In such cases, the non-linear channel can include a portion that runs across the afterburner (e.g., laterally or horizontally or perpendicular to the general flow of exhaust from an inlet face or surface to an outlet) and in thermal communication with the cathode air conduits. An afterburner having non-linear channels where at least a portion of the channel runs across the afterburner also can enable fluid flow through the afterburner to be equalized and/or more evenly distributed.

In addition, the non-linear or tortuous channels can be designed and constructed to provide increased surface area for the presence of a catalyst compared to straight or linear channels. The non-linear or tortuous channels also can be designed to increase the exhaust stream/reactant(s) mixing into and through the afterburner.

The construction of the afterburners of the present teachings permits the control and local deposition of a catalyst such as a combustion catalyst to only the exposed surfaces of the channels that are in direct contact with an exhaust stream. That is, the afterburners of the present teachings generally are made of several layers of a compressible, resilient refractory material such as an alumina and/or silica fiber felt or paper. Different hole or aperture patterns can be created in each layer, for example, by laser cutting or die cutting. The layers then can be sequentially stacked on top of each other to create the non-linear or tortuous channels through the stacked layers of compressible, resilient refractory material. However, prior to stacking, a catalyst can be associated with, for example, applied to or coated on, the exposed faces or surfaces of the holes or apertures that will be in direct contact with the exhaust stream, thereby limiting catalyst loading and likely realizing a cost reduction.

A gradient of catalyst loading (amount) and/or composition can be present generally along the vertical direction of fluid flow through the non-linear or tortuous channels from an inlet to an outlet of the afterburner. That is, the construction of the layered structure of the afterburner can permit an effective gradient to be created in the channels of the afterburner as the inner or central layers of the stack of layers can contain a high loading of catalyst while the outer layers can include little or no catalyst. Because each layer of the afterburner can be independently associated with a catalyst, control of the amount and type of catalyst in a non-linear or tortuous channel can be readily realized.

For example, near an igniter for initiating a catalytic combustion reaction, the channels of such layer or layer(s) can include a catalyst loading having a higher percentage of a highly reactive catalyst such as platinum. Other layers of the stack of layers, particularly downstream of from where the combustion reaction has been initiated, can include a less expensive and/or reactive catalyst such as a perovskite-based catalyst. In such a design, location and/or temperature of the primary "hot spot(s)" can be controlled to avoid the excessive temperatures that could denigrate and/or vaporize the catalyst. In addition, the grading of the catalyst loading and/or composition can account for changes in exhaust stream such as due to changing fuel compositions during operation.

Another advantage of the present teachings can include the insulating properties of the compressible, resilient refractory material. The compressible, resilient refractory materials tend to be good thermal insulation materials such that thermal losses from the afterburner can be reduced. In connection with a fuel cell unit, reducing the thermal losses from the afterburner can provide good kinetics for continued combustion at lower fuel flow rates as well as at increased exhaust stream flow rates such as when a load is drawn from fuel cell stack.

Thus, in one aspect, the present teachings provide an afterburner for reducing contaminants in an exhaust stream or other contaminant-containing stream. The afterburner generally includes a substrate including a compressible, resilient refractory material. The substrate defines non-linear or tortuous channels therethrough from an inlet of the substrate to an outlet of the substrate. For example, in some embodiments, a non-linear or tortuous channel extends greater than about 50% of the length across the substrate in a direction perpendicular to the flow of fluid(s) such as an exhaust stream from the inlet of the afterburner to the outlet of the afterburner.

A catalyst such as a combustion catalyst can be associated with portions of the exposed surfaces of the substrate along the non-linear channels. In certain embodiments, the amount of combustion catalyst present on the substrate along a non-linear channel includes one or more gradients from the inlet of the substrate to the outlet of the substrate.

In various embodiments, the afterburner can be a stack of layers of a compressible, resilient refractory material. The afterburner can include a solid thermal insulation material adjacent to the non-inlet and non-outlet faces or surfaces of the afterburner. The afterburner can include an igniter and/or a thermal sensor assembly.

The afterburner can be a component of a fuel cell unit and/or a fuel cell system. In such cases, the afterburner can be in operable fluid communication with a fuel cell stack of the fuel cell unit or system. For example, the inlet of the afterburner can be in (operable) fluid communication with the outlet of the fuel cell stack and/or the exhaust stream from the fuel cell stack.

The afterburner can be a component of a heater unit or a combined heat and power system. The afterburner of a heater unit, which can be independent or part of a combined heat and power system, can be in operable fluid communication with a source of reformable fuel or another combustible fuel. For example, a source of reformable (or other combustible) fuel can be in operable fluid communication with an inlet of a stack of layers of an afterburner and/or an inlet of an afterburner.

In another aspect, the present teachings include methods of reducing contaminants in a fluid stream and/or generating heat. The methods generally include flowing a fluid comprising contaminants and/or a reformable fuel through non-linear channels of an afterburner, and combusting, at least partially, the fluid including contaminants and/or the reformable fuel with a combustion catalyst to produce an outlet fluid stream having a reduced amount of contaminants compared to the fluid entering the afterburner and/or to produce heat. The afterburner can be any of the afterburners of the present teachings. For example, the afterburner generally includes a compressible, resilient refractory material that defines the non-linear channels from an inlet of the afterburner to an outlet of the afterburner, which compressible, resilient refractory material can be present in layers that are stacked. The afterburner also includes a combustion catalyst associated with at least a portion the exposed surfaces of the non-linear channels.

The methods of the present teachings can include beating a cathode air stream flowing through the afterburner using the heat from combusting. The methods can include controlling the combustion of the fluid including contaminants and associated heat generation by using a gradient of the amount of the combustion catalyst present in the non-linear channels. In the practice of the methods of the present teachings, the pressure drop through the afterburner can be less than or equal to one inch of water.

In yet another aspect, the present teachings provide methods of making an afterburner. The methods of making an afterburner generally include cutting at least one aperture in a layer of a compressible, resilient refractory material; repeating the cutting step to create a plurality of layers, each defining one or more apertures through each respective layer; associating a combustion catalyst with exposed surfaces of at least one or more of the apertures of at least one layer; stacking the plurality of layers to form non-linear channels through the stack of layers, where the combustion catalyst is associated with at least a portion the exposed surfaces of at least one of the non-linear channels; and securing the plurality of layers to form the afterburner.

Methods of making an afterburner can include wrapping a refractory material around the non-inlet and non-outlet faces or surfaces of the stack of layers and/or surrounding the non-inlet and non-outlet faces or surfaces of the afterburner with a solid thermal insulation. The methods also can include removing any binders and/or organic materials present in the layers of compressible, resilient refractory material, for example, by heating in a furnace to burn off such materials.

The foregoing as well as other features and advantages of the present teachings will be more fully understood from the following figures, description, examples, and claims.

DESCRIPTION OF DRAWING

It should be understood that the drawings described below are for illustration purposes only. Like numerals generally refer to like parts. The drawings are not necessarily to scale, with emphasis generally being placed upon illustrating the principles of the present teachings. The drawings are not intended to limit the scope of the present teachings in any way.

DETAILED DESCRIPTION

Figures 1A, 1B, 1C, 1D, 1E:
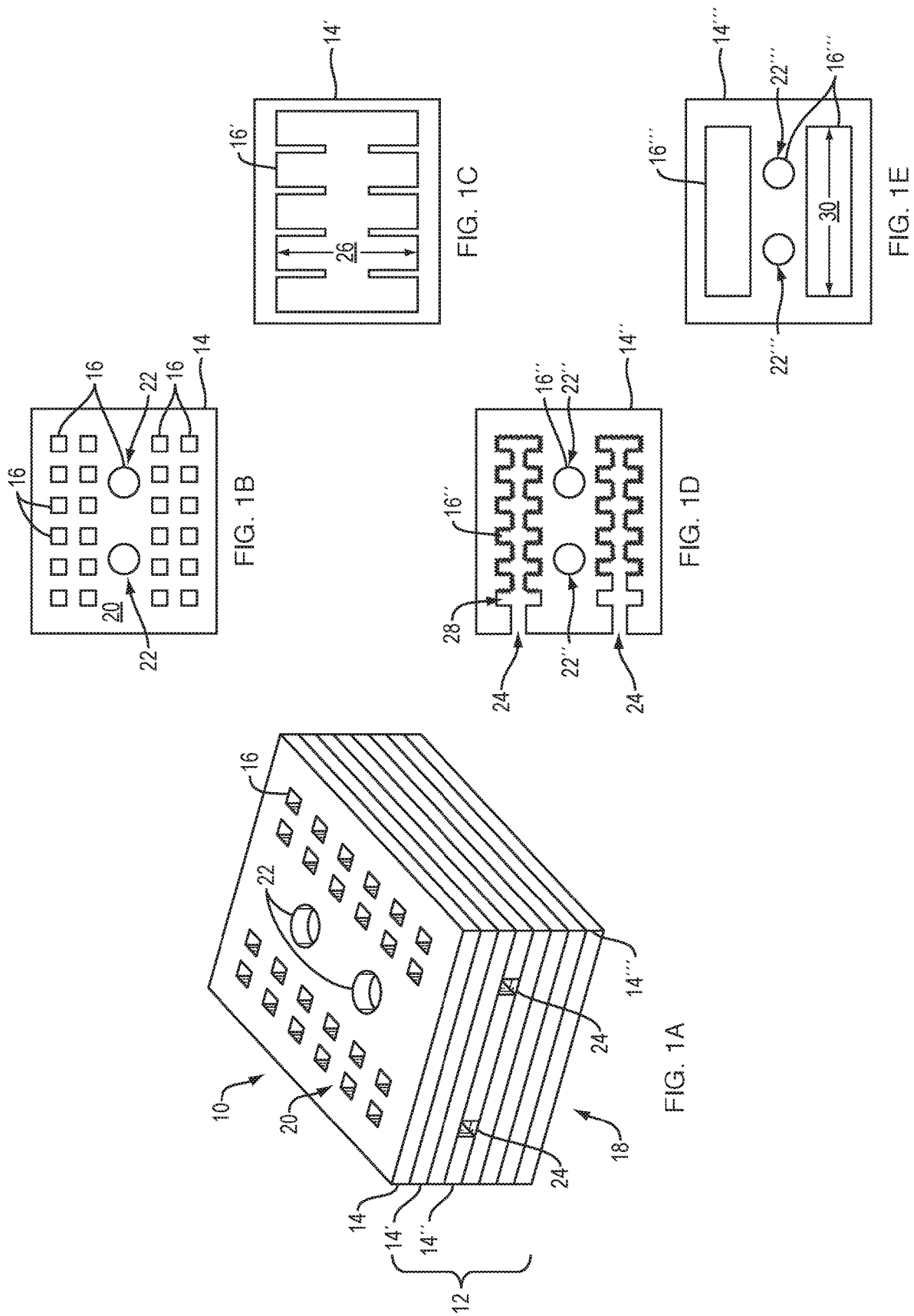
FIG. 1A is a schematic diagram of a perspective view of an embodiment of an afterburner of the present teachings.
FIGS. 1B-1E are schematic diagrams of top views of individual layers of the embodiment of an afterburner as shown in FIG. 1A.

It now has been discovered that a compressible, resilient refractory material that defines non-linear or tortuous catalyst-containing channels therethrough can be used as an afterburner for reducing contaminants in a fluid stream such as an exhaust stream from a fuel cell stack.

More specifically, the present teachings provide afterburners with various configurations and features that can advantageously control and direct heat generated by combustion reaction(s) therein to avoid degradation of the combustion catalyst and assist with the thermal management of the afterburner and/or the system of which it is a component. The compressible, resilient refractory material also can assist in reducing thermal losses from the afterburner that can further assist in the thermal management of the afterburner and its associated system.

The design and construction of the afterburners of the present teachings can permit the exploitation of many of the features described herein, in various combinations, which can reduce the footprint or package of overall fuel cell unit and system. For example, the increased surface area for combustion catalyst loading along the non-linear or tortuous channels of the afterburner can permit the afterburner to be of a smaller volume for a desired volume flow-through or output. A smaller volume can translate into a smaller footprint for its associated system, such as a fuel cell unit, a fuel cell system, or a combined heat and power ("CHP") system, and in particular, where such units and/or systems are designed as modular units for readily expanding and/or replacing such units in a modular-compatible system.

Moreover, the compressible and resilient characteristics of an afterburner of the present teachings can permit the afterburner to accommodate the thermal cycling, and associated expansion and contraction of an adjacent exhaust-generating component such as a fuel cell stack. In other words, such characteristics can mitigate or avoid creating the usual thermal stresses and flow-around often created by thermal cycling.

It should be understood that the afterburners and methods of the present teachings are compatible and can be practiced, respectively, with any catalytic and/or combustion-related process for reducing contaminants. However, the description will focus on fuel cell units, fuel cell systems and CHP systems, and afterburners appropriate for such units and systems.

Throughout the application, where compositions are described as having, including, or comprising specific components, or where processes are described as having, including, or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition, an apparatus, or a method described herein can be combined in a variety of ways without departing from the spirit and scope of the present teachings, whether explicit or implicit herein. For example, where reference is made to a particular structure, that structure can be used in various embodiments of apparatus of the present teachings and/or in methods of the present teachings, unless otherwise understood from the context. In other words, within this application, embodiments have been described and depicted in a way that enables a clear and concise application to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

It should be understood that the expression "at least one" of includes individually each of the recited objects after the expression and the various combinations of two or more of the recited objects unless otherwise understood from the context and use. The expression "and/or" in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

The use of the singular herein, for example, "a," "an," and "the," includes the plural (and vice versa) unless specifically stated otherwise.

Where the use of the term "about" is before a quantitative value, the present teachings also include the specific quantitative value itself, unless specifically stated otherwise. As used herein, the term "about" refers to a ±10% variation from the nominal value unless otherwise indicated or inferred.

Where a percentage is provided with respect to an amount of a component or material in a structure or composition, the percentage should be understood to be a percentage based on weight, unless otherwise stated or understood from the context.

Where a molecular weight is provided and not an absolute value, for example, of a polymer, then the molecular weight should be understood to be an average molecule weight, unless otherwise stated or understood from the context.

It should be understood that the order of steps or order for performing certain actions is immaterial so long as the present teachings remain operable. Moreover, two or more steps or actions may be conducted simultaneously.

At various places in the present specification, values are disclosed in groups or in ranges, it is specifically intended that the description include each and every individual subcombination of the members of such groups and ranges and any combination of the various endpoints of such groups or ranges. For example, an integer in the range of 0 to 40 is specifically intended to individually disclose 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, and 40, and an integer in the range of 1 to 20 is specifically intended to individually disclose 1, 2, 3, 4, 5, 6, 7, 8, 9, 10, 11, 12, 13, 14, 15, 16, 17, 18, 19, and 20.

The use of any and all examples, or exemplary language herein, for example, "such as" or "including," is intended merely to illustrate better the present teachings and does not pose a limitation on the scope of the invention unless claimed. No language in the specification should be construed as indicating any non-claimed element as essential to the practice of the present teachings.

Terms and expressions indicating spatial orientation or altitude such as "upper," "lower," "top," "bottom," "horizontal," "vertical," and the like, unless their contextual usage indicates otherwise, are to be understood herein as having no structural, functional or operational significance and as merely reflecting the arbitrarily chosen orientation of the various views of apparatus, devices, components, and/or features of the present teachings that may be illustrated in certain of the accompanying figures.

As used herein, a "fuel cell stack" refers to the component of a fuel cell unit or fuel cell system where the electrochemical reaction takes place to convert hydrogen or electrochemically-oxidizable species to electricity. The fuel cell stack includes an anode, a cathode, and an electrolyte, often formed in layers. In operation, hydrogen and any other electrochemically oxidizable components) of a reformate entering a fuel cell stack, for example, from a reformer and/or a fluid mixing device of the present teachings, combine with oxygen anions within an anode layer of the fuel cell stack to produce water and/or carbon dioxide and electrons. The electrons generated within the anode layer migrate through the external load and hack to the cathode layer where oxygen combines with the electrons to provide oxygen anions which selectively pass through the electrolyte layer and the anode layer.

As used herein, a "fuel cell unit" generally refers to a reformer in operable fluid communication with a fuel cell stack, a fuel cell stack, and an afterburner in operable fluid communication with exhaust from the fuel cell stack. A fuel cell unit can include a vaporizer, where an outlet of the vaporizer is in operable fluid communication with an inlet of the reformer and/or the fuel cell stack. A fuel cell unit can include various valve assemblies, sensor assemblies, conduits, and other components associated with such a unit. A "fuel cell system" generally refers to a fuel cell unit and the balance of plant. A fuel cell system often includes a plurality of fuel cell units. A plurality of fuel cell units can share the balance of plant. However, it should be understood that a "fuel cell unit" and a "fuel cell system" can be used interchangeably herein unless the context dictates otherwise. Moreover, known and conventional fuel cells come in a variety of types and configurations including phosphoric acid fuel cells (PAFCs), alkaline fuel cells (AFCs), polymer electrolyte membrane (or proton exchange membrane) fuel cells (PEMFCs), and solid oxide fuel ceils (SOFCs).

As used herein, a "combined heat and power system" or "CHP system" generally refers to a system that generates electricity and useable heat. A CHP system generates electricity and in doing so, can produce heat that can be captured and used in a variety of ways rather than be discarded as waste heat. Certain types of fuel cell systems can be CHP systems, depending on whether the reforming, electrochemical, and other chemical reactions generate heat, i.e., are exothermic. In such systems, the thermal output typically depends on the electrical output of the fuel cell unit(s). A CHP system, can include one or more fuel cell units. A CHP system can include one or more fuel cell units integrated with one or more heater units, and the balance of plant. In such systems where one or more heater units are present, the thermal output can be independent, of the electrical output. Accordingly, such a CHP system can provide, at desired levels, a thermal output only, an electrical output only, or both thermal and electrical outputs.

As such, the fuel cell systems including an afterburner of the present teachings as described herein can be also operated as CHP systems where a fuel cell unit and a heater unit are included in the CHP system. A heater unit can be envisioned as a catalytic burner that cars assist in maintaining a consistent heat output and accordingly, can include an afterburner of the present teachings. That is, similar to a fuel cell unit, a heater unit can convert gaseous reformable fuels (from a source of (reformable or other combustible) fuel in fluid communication therewith, e.g., an inlet of the stack of layers and/or an inlet of the afterburner) into heat, for example, using an afterburner of the present teachings, but without the production of electricity. The use of a heater in conjunction with a fuel cell can separate the heat output from the electrical output of the CHP system. The fuel cell unit and the heater unit can be operated independently via a user interface to produce heat output only at a desired output level, an electrical power with no additional heat output, or an electrical output with additional heat output at a desired output level. Thus, a more consistent heat and power output can be realized with a CHP system as the various components of the system can be operated and adjusted as needed to maintain the desired balance.

As used herein, "in operable fluid communication with" refers to fluid communication between or among various components and/or structure when the components and/or structure are in an operative or active state or position; however, fluid communication can be interrupted when the components and/or structure are in an inoperative or inactive state or position. Operable fluid communication can be controlled by a valve assembly positioned between or among components and/or structure. For example, if A is in operable fluid communication with B via a valve assembly, then fluid can flow or be delivered from A to B when the valve assembly is "open" thereby permitting fluid communication between A and B. However, fluid communication between A and B can be interrupted or ceased when the valve assembly is "closed." In other words, the valve assembly is operable to provide fluid communication between A and B. It should be understood that fluid communication can include various degrees and rates of fluid flow and related characteristics. For example, a fully-opened valve assembly can provide fluid communication between or among components and/or structure as can the valve assembly when it is partially-closed; however, the fluid flow characteristics such as flow rate can be affected by the different positions of the valve assembly. As used herein, "in operable fluid communication with" and "in fluid communication with" can be used interchangeably unless the context dictates otherwise.

As used herein, "in thermal communication with" refers to thermal communication between or among various components and/or structure such that heat transfer can occur between or among the components and/or structure. Although components and structure typically in thermal communication remain in thermal communication, where the thermal, communication can be interrupted, for example, ceasing the flow of heated fluids to components and/or structure or placing art insulation barrier or structure between or among components and/or structure, "in operable thermal communication with" can be a more appropriate expression similar to the expression and meaning of "in operable fluid communication with," However, as used herein, "in thermal communication with" and "in operable thermal communication with" can be used interchangeably unless the context dictates otherwise.

As used herein, to "control the flow," "control the delivery," "adjust the flow," and "adjust the delivery" of a fluid, including grammatical equivalents and equivalent expressions and language, can be to increase the flow or delivery of fluid, to decrease the flow or delivery of fluid, to maintain a substantially constant flow or delivery of fluid, and/or to interrupt or cease the flow or delivery of fluid.

Similarly, to "control the pressure" and "adjust the pressure," including grammatical equivalents and equivalent expressions and language, can be to increase the pressure, to decrease the pressure, to maintain a substantially constant pressure, and/or to interrupt or cease the pressure. It should be understood that in many circumstances, to "control the flow" and "adjust the flow" can be to "control the pressure" and "adjust, the pressure," and vice versa. In addition, "controlling," "adjusting," and "manipulating" a component of a fuel cell unit, a heater unit, a fuel cell system, or a CHP system (including grammatical equivalents and equivalent expressions and language), for example, a valve assembly or a source of positive gaseous pressure, can effect the same changes and/or steady-state operation as described above.

As used herein, a "valve assembly" refers to a structure or structures together that can monitor and/or control fluid communication and fluid flow characteristics between or among components and/or structure, for example, the delivery of a reformable fuel to a reformer or the flow of heat exchange liquid through a liquid heat exchange plate or jacket. A valve assembly can be a single valve or include a plurality of valves and related structure, where certain structures can be in series. A valve assembly can be or include a pressure metering assembly. For example, a valve assembly can be or include a metering valve thereby permitting digital control of the flow and delivery of fluids. A valve assembly can be or include valves in a piccolo arrangement, for example, a series of orifices, each associated with a proportional valve. A valve assembly can include a proportional valve such as a proportional solenoid valve; or a series of proportional valves such as a series of proportional solenoid valves. A valve assembly can include an on/off valve such as a solenoid valve; or a series of on/off valves, for example, a series of on/off solenoid valves. A valve assembly can include a three-way valve; a series of three-way valves; a check valve; a series of check valves; an orifice; a series of orifices; and combinations thereof and of the other valves and valve assemblies described herein, where certain of the valves and valve assemblies can be in series. Where structures or components are indicated as being in series, the components can be either in a parallel series or in a sequential series (e.g., collinear).

As used herein, a "sensor assembly" refers to any suitable sensor or sensing device or combination of sensor or sensing devices for the operating parameter(s) being, monitored, measured and/or determined. For example, fuel flow rates can be monitored with any suitable flow meter, pressures can be monitored with any suitable pressure-sensing or pressure-regulating device, and temperatures ears be monitored with any suitable temperature sensor. Accordingly, examples of sensor devices include flow meters, pressure meters, thermocouples, thermistors, and resistance temperature detectors. A sensor or sensing device can include a balance, a weighing scale such as a spring scale, or other device for monitoring, measuring, and/or determining the weight of an object. The sensor assemblies optionally can include a transducer in communication with the controller.

The exemplary fuel cell systems depicted in the figures. Include various conduits, for example, a cathode air delivery conduit, an anode reactants delivery conduit, an afterburner exhaust conduit, and the like. A fuel cell system or a CHP system of the present teachings can include a plurality of conduits, tor example, two or more conduits, positioned to provide operable fluid communication between or among components of the fuel cell or CHP system. A plurality of conduits also can couple a fuel cell unit or fuel cell or CHP system, for example, to components common to the fuel cell or CHP system such as a vaporizer and/or reformable fuel source. That is, the components of the fuel cell or CHP systems and methods of the present teachings including peripheral components and devices can include conduits connecting or linking the components, for example, a vaporizer, a (hydrocarbon fuel) reformer, and related equipment such as valve assemblies, pumps, and sensor assemblies. Each of these components and others can include one or more of an inlet, an outlet, and a port to permit fluid communication, for example, operable fluid communication, to be established between or among the components. It also should be understood that the conduits can include other components and devices associated therewith, for example, valve assemblies, pumps, sources of positive gaseous pressure, and sensor assemblies.

The conduits or conduit system can have many specific designs, configurations, arrangements, and connections depending on many factors, for example, the particular application, the reformable fuel, and the footprint size of the overall fuel cell or CHP system. Thus, the conduit systems described and/or shown herein are merely for illustrative purposes and are not meant to limit the present teachings in any way. Moreover, where two or more conduits may be described as connected to, coupled to, or otherwise joining a component or components, tor example, a valve assembly and a source of reformable fuel, a single conduit also can be envisioned as achieving the same design and/or purpose, where the component such as a valve assembly can be described as being "in-line with," "situated within," or "associated with" a single conduit. In addition, "coupled to," "connected to" or otherwise joining two or more components or structure can mean that the one component or structure is directly or indirectly coupled, connected or joined to another component or structure.

A conduit can be a duct, tor example, a channel, tube or passageway tor conveying a fluid. For example, an exhaust conduit can be used to carry or deliver exhaust fluids away from a fuel cell unit, for example, from an afterburner, to the exterior of the fuel cell unit, which may be within a thermally-shielded zone or a thermally-regulated zone, or outside or exterior to such zones. A conduit can be a manifold, for example, a chamber, pipe or duct with a number of inlets and/or outlets used to collect and/or distribute a fluid. As used herein, a "common conduit" generally refers to a multi-ported conduit for fluid delivery to and/or from specific locations.

A fuel cell unit, a fuel cell system, a heater unit, and a CHP system of the present teachings can include a control system for automating the operations of the individual units, components thereof, and/or of the overall system. A control system can include control components, for example, control electronics, actuators, valve assemblies, sensor assemblies, and other structure and devices to monitor, control and/or adjust the operation of an individual fuel cell unit or heater unit; one or more components thereof such as a vaporizer, a reformer, a fuel cell stack and an afterburner; a fuel cell system or a CHP system; and one or more components thereof such as the balance of plant, for example, a source of positive gas pressure and/or a source of oxygen-containing gas.

A control system can include a controller, which can be in communication with the various control components and components of each fuel cell unit and/or heater unit. The control system and/or controller can monitor and logically control the flow path of fluids (e.g., liquid and gaseous reactants such as reformable fuel, an oxygen-containing gas and steam; air such as temperature-regulating air, radiated heated air, and cathode air; exhaust streams; and heat-exchange liquid) through individual components of a fuel cell unit or a heater unit, through individual fuel cell units or heater units, and through a fuel cell system or a CHP system. In other words, a custom fluid circuit can be achieved in a fuel cell system or a CHP system using a control system.

In certain methods of the present teachings, the heated fluid streams generated by one or more operating afterburners can be diverted to a "cold" fuel cell unit such as a newly-coupled fuel cell unit in a fuel cell or CHP system to facilitate start-up of the "cold" fuel cell unit. That is, the heated fluid streams from the operating afterburners can be directed to or partially diverted to a "cold package" to assist in heating the various components of a fuel cell unit, for example, one or more of the reformer, the fuel cell stack, and the afterburner, while in start-up mode. The use of heat from the operating afterburners can reduce start-up times for the cold fuel cell unit, for example, assisting in initiating catalytic activity within one or more components of the fuel cell unit.

As can be inferred from the foregoing, a fuel cell unit can include fuel cell unit control components that can be configured or adapted to communicate and control operations within the fuel cell unit. A fuel cell or CHP system can include fuel cell system control components or CHP system control components, respectively, that can be configured or adapted to communicate among the individual fuel cell units and heater units, if present, and control the operations of the fuel cell or CHP system. The fuel cell system control components and the CHP system control components can be in communication with the individual fuel cell units and heater units, if present.

The control system can include a one or more sensors or sensor assemblies in communication with a controller. In response to input signals from the sensor assemblies, user commands from a user-input device and/or programmed subroutines and command sequences, a controller can manage independently the operations of one or more fuel cell units and/or heater units, or of the overall fuel cell or CHP system. The controller can be software operating on a processor. However, it is within the scope of the present teachings to employ a controller that is implemented with one or more digital or analog circuits, or combinations thereof.

The sensor assemblies can, but do not necessarily, include a transducer in communication with the controller. The communication pathways will ordinarily be wired electrical signals but any other suitable form of communication pathway can also be employed. That is, the sensor assemblies, control signal-receiving devices, and communication pathways herein can be of any suitable construction. A wireless communication pathway can be used, such as a Bluetooth connection. The wireless communication pathway(s) can be part of a wireless network that uses wireless data connections for connecting network nodes. A combination of wired and wireless communication pathways can be used.

A fuel cell unit typically includes power conditioning components that can be configured or adapted to convert the electrical output of a fuel cell stack into a regulated electrical output of the fuel cell unit. Power conditioning components, which can be referred to as power handling components or power management components, can include current collection plates and/or bus bars that can carry the electrical current away from the fuel cell stack and deliver it external to the fuel cell unit. Power conditioning components typically are located close to the fuel cell stack where the electricity is generated. As such, power conditioning components can be exposed to the high operating temperatures of the fuel cell stack and the fuel cell unit. Nevertheless, heat transfer away from such components such as with the use of a liquid heat-exchange plate or jacket adjacent to or around a fuel cell unit and/or at least adjacent to the power conditioning components can reduce the electrically resistive losses.

As used herein, "reducing contaminants," "reducing the amount of contaminants," "reducing the level of contaminants," or "reducing the content of contaminants" in or of a fluid, a fluid stream such as an exhaust stream, or a multi-component mixture or stream, including grammatical equivalents and equivalent expressions or language, is intended to encompass a process of providing or creating a (product) fluid, a (product) fluid stream, or a (product) multi-component mixture where a contaminant or an undesirable compound or component in the fluid, the fluid stream, or the multi-component mixture has been decreased, diluted or otherwise made less abundant from its concentration or abundance in the original fluid, the original fluid stream such as original exhaust stream, or the original multi-component mixture.

Similarly, a fluid, a fluid stream such as an exhaust stream, or a multi-component mixture having a "reduced amount," a "reduced level," or a "reduced content" of a contaminant or an undesirable compound or component, including grammatical equivalents and equivalent expressions or language, is intended to encompass a (product) fluid, a (product) fluid stream such as a (product) exhaust stream, or a (product) multi-component mixture where a contaminant or an undesirable compound or component in the fluid, the fluid stream or the multi-component mixtures has been decreased, diluted or otherwise made less abundant from its concentration or abundance in the original fluid, the original fluid stream such as the original exhaust stream, or the original multi-component mixture.

Reducing, reducing the amount of, reducing the level of and reducing the content of contaminants in or of a fluid, a fluid stream such as an exhaust stream, or a multi-component mixture, and a reduced amount, a reduced level, and a reduced content of a contaminant or an undesirable compound or component can result in a (product) fluid or fraction, a (product) fluid stream or fraction such as an (product) exhaust stream or fraction, or a (product) multi-component mixture or fraction where the presence of one or more contaminants or undesirable compounds or components is at a concentration or abundance of less than or equal to about 90%, less than or equal to about 80%, less than or equal to about 75%, less than or equal to about 70%, less than or equal to about 60%, less than or equal to about 50%, less than, or equal to about 45%, less than or equal to about 40%, less than or equal to about 35%, less than or equal to about 30%, less than or equal to about 25%, less than or equal to about 20%, less than or equal to about 15%, less than or equal to about 10%, less than or equal to about 5% or less, relative to its or their concentration or abundance in the original fluid, the original fluid stream such as the original exhaust stream, or the original multi-component mixture. That is, greater than or equal to about 10%, 20%, 25%, 30%, 40%, 50%, 55%, 60%, 65%, 70%, 75%, 80%, 85%, 90%, or 95% or more, respectively, of the one or more contaminants or undesirable compounds or components have been reduced, decreased, diluted or otherwise made less abundant in the (product) fluid or fraction, a (product) fluid stream or fraction such as an (product) exhaust stream or fraction, or a (product) multi-component mixture or fraction compared to in the original fluid, the original fluid stream, or the original multi-component mixture.

The present teachings provide afterburners that can reduce the contaminants in a fluid stream such as an exhaust stream from a fuel cell stack. An afterburner of the present teachings can be described as a substrate including a compressible, resilient refractory material that defines non-linear channels therethrough from an inlet of the substrate to an outlet of the substrate. A catalyst such as a combustion catalyst is associated with portions of the exposed surfaces of the substrate along the non-linear channels. The amount of combustion catalyst present on the substrate along one or more non-linear channels can include one or more gradients from the inlet of the substrate to the outlet of the substrate. The inlet of the substrate can include a plurality of inlets open through a (first) face or surface of the substrate (an inlet face or inlet surface of the stack of layers). The outlet of the substrate can include a plurality of outlets open through another (second) face or surface of the substrate, for example, an opposite face of the substrate (an outlet face or outlet surface of the stack of layers). In various embodiments, the compressible, resilient refractory substrate includes a plurality of layers of a compressible, resilient refractory material.

In various embodiments, the afterburner can include a stack of layers, each layer including a compressible, resilient refractory material and defining one or more apertures through the layer, where the stack of layers defines non-linear channels through the stack of layers from an inlet (e.g., side or face) of the stack of layers to an outlet (e.g., face or side) of the stack of layers. A combustion catalyst is associated with exposed surfaces of the at least one or more apertures of at least one layer of the stack of layers such that the combustion catalyst is associated with an exposed surface of a non-linear channel. The non-linear channels can be tortuous channels.

The compressible, resilient refractory material can include silica and/or alumina such as fibers of silica, alumina, or silica-alumina mixtures. A layer of a compressible, resilient refractory material can be in the form of a paper, a felt, a mat, or a blanket. A layer of a compressible, resilient refractory material can be in the form of a continuous strand mat, a chopped mat, or woven or knit cloth. Examples of layers of compressible, resilient refractory materials include alumina fibres felts and alumina fibres papers sold under the trademark SAFFIL®, available from Saffil Ltd.; a paper produced from DENKA® alumina fibres sold under the trademark KAOWOOL® as KAOWOOL® 3000, available from Morgan Thermal Ceramics; and ceramic fiber felts sold under the trademark FIBERFRAX®, available from Unifrax.

The design and construction of the afterburner in layers can permit greater control over one or more of the size and interconnectedness or network of non-linear channels, the surface area of exposed surfaces of the non-linear channels, and the content and placement of catalyst along the exposed surfaces of the non-linear channels that contact the fluid or fluid stream to be treated. For example, the non-linear channels can be designed to deliver heat from the combustion reaction within the afterburner to other components and structure (e.g., a cathode air conduit) in thermal communication with the heated combustion fluid or fluid stream.

Examples of catalysts useful in the present teachings include platinum, palladium, rhodium, cerium, iron, manganese, nickel, copper, a perovskite, and combinations thereof. Because a catalyst can be selectively placed along the non-linear channels exposed to a fluid stream containing contaminants, a highly reactive but expensive catalyst cars be sparingly used on the exposed surfaces of the non-linear channels in thermal communication, for example, in close proximity to, an igniter to facilitate effective initiation of the combustion reaction, for example, upon start-up of the afterburner, in non-linear channels where the temperature can be relatively high during operation, a more cost effective catalyst can be used such as a perovskite.

Perovskite catalysts can be characterized by the structure $ABX_3$ where "A" and "B" are cations of very different sizes and "X" is an anion, generally oxygen, that bonds to both cations. Examples of suitable perovskite catalysts include $LaNiO_3$, $LaCoO_3$, $LaCrO_3$, $LaFeO_3$ and $LaMnO_3$. The perovskite can be $La_{1-x}Ce_xFe_2O_3$, $LaCr_{1-y}Ru_yO_3$, $La_{1-x}Sr_xAl_{1-y}Ru_yO_3$ and $La_{1-x}Sr_xFe_2O_3$, including combinations thereof, where x and y are numbers ranging from 0.01 to 0.5, for example, from 0.05 to 0.2, depending on the solubility limit and cost of the dopants. In addition, other appropriately transition metal-doped perovskites can be used in the practice of the present teachings.

A catalyst can be associated with the exposed surfaces of an aperture of a layer of refractory material using solution processing techniques in addition to other more expensive processes such as vapor deposition. Common solution processing techniques include, for example, spin coating, drop-casting, zone easting, dip coating, blade coating, or spraying. A washcoat technique also can be used, where the washcoat is a carrier for and used to disperse the catalyst(s). Washcoat materials such as aluminum oxide, titanium dioxide, silicon dioxide or mixtures of alumina and silica can be selected to form a rough, irregular surface, which can increase the surface area compared to a smooth surface of a bare substrate. The increased surface area in turn can maximize the catalytically-active surface available to react with the exhaust stream through the afterburner.

Another example of a solution processing technique is printing. As used herein, "printing" includes a noncontact process such as inkjet printing, microdispensing and the like, and a contact process such as screen-printing, gravure printing, offset printing, flexographic printing, lithographic printing, pad printing, microcontact printing and the like.

The amount and/or type of combustion catalyst present on the exposed surfaces of a non-linear channel can include a gradient. The gradient can include an increase in the amount of combustion catalyst present from the inlet of the stack of layers to the outlet of the stack of layers. The gradient can include a change in the type of catalyst associated with the exposed surfaces of the channels through the stack of layers. A second and higher order gradient also can be present. A second gradient can include a decrease in the amount of combustion catalyst present, for example, after the increasing gradient and towards the outlet of the stack of layers. A second gradient can include another change in the type of catalyst associated with the exposed surfaces of the channels through the stack of layers.

In various embodiments, the layers can be arranged such that the exposed surfaces of the one or more apertures of the layer of the stack of layers closest to the inlet of the afterburner and/or the layer of the stack of layers closest to the outlet of the afterburner do not comprise a combustion catalyst. In some embodiments, the exposed surfaces of one or more apertures of one or more layers of the stack of layers away from the inlet and the outlet of the afterburner include a combustion catalyst and an increased surface area compared to the exposed surfaces of one or more apertures of layers of the stack of layers closest to the inlet and the outlet of the afterburner. In certain arrangements of the layers, at least one of the layers of the one or more layers of the stack of layers away from the inlet and the outlet of the afterburner including a combustion catalyst and an increased surface area includes one or more apertures designed to mount an igniter and/or a thermocouple.

In one feature of the present teachings, at least one layer of the stack of layers includes an aperture defining a channel that extends greater than about 50% of the length across the stack of layers in a direction perpendicular to the flow of exhaust through the stack of layers from an inlet of the afterburner to an outlet of the afterburner. In particular afterburners, each layer can define an aperture designed to create a cathode air channel through the stack of layers whereby the cathode air channel can accommodate a cathode air conduit. In such embodiments, the aperture defining a channel that extends greater than about 50% of the length across the stack of layers in a direction perpendicular to the flow of exhaust through the stack of layers can include the cathode air channel. In addition to providing effective heat transfer, a portion of a non-linear channel that extends across the afterburner can assist with equalizing and/or distributing evenly the flow of fluids through the afterburner.

The afterburners of the present teachings can include an igniter. The igniter can be in operable thermal communication with a catalyst such as a combustion catalyst. The igniter can locally heat a section of a channel containing a catalyst to initiate a combustion reaction. Subsequently, the heat from the combustion reaction can be transferred through the non-linear channels of the afterburner to initiate a combustion reaction throughout the afterburner.

The igniter can be positioned in operable thermal communication with the exposed surfaces of the one or more apertures of the layer closest to the inlet of the stack of layers including a combustion catalyst. An afterburner can include more than one igniter. The position of an igniter, for example, its association with one or more layers (or channels) near an inlet or further upstream is dependent on the particular application, catalyst used, catalyst loading, and various other factors impacting ignition of the afterburner.

For example, the use of a gradient of the amount of catalyst and/or the type of catalyst associated with the exposed surfaces of the non-linear or tortuous channels can be useful in connection with placement of an igniter for the afterburner. For example, a non-linear channel created by the stack of layers and in thermal communication with an igniter can include a highly reactive catalyst to facilitate effective ignition of the combustion reaction(s) within the afterburner. However, moving away from the igniter through the non-linear channel, the amount of highly reactive catalyst can be reduced or eliminated and replaced with an increasing amount of a less reactive and more cost effective catalyst, which can maintain the combustion process during operation.

The afterburner of the present teachings can include a thermal sensor assembly such as a thermocouple. The thermal sensor assembly can be in thermal communication with one or more non-linear channels including a catalyst such as a combustion catalyst. The thermal sensor assembly can be positioned partially or completely within a channel formed by the stack of layers or can be positioned in thermal communication with the exhaust of the afterburner. The position of a thermal sensor assembly, for example, its association with one or more layers (or channels) of an afterburner is dependent on the particular application and desired monitoring of the temperature of the afterburner. A thermal sensor assembly can be positioned in a location in physical isolation from the igniter of the afterburner (but can be in thermal communication with the igniter via the network of non-linear channels.

For example, a thermocouple can be positioned above the outlet of the afterburner such as a few millimeters above the outlet face or surface of a stack of layers of the afterburner. The thermocouple can be placed in a sheath or tube such as an alumina tube with an end of the thermocouple exposed to the exhaust stream, which sheath or tube can shield much of the thermocouple from the high temperatures of the exhaust stream. The thermocouple or its exposed end can be positioned over the compressible, resilient refractory material rather than an aperture or channel outlet, which positioning can further shield the thermocouple from the direct heat of the exhaust.

When the thermal sensor assembly is positioned away from the "hot spot" or core of the combustion reaction within the afterburner, the temperature measurement of the thermal sensor assembly will be shifted lower and offset from the actual combustion core temperature. That is, the thermal sensor assembly will provide a reference temperature at a lower temperature than at the combustion core, which placement and reference temperature prevents the thermal sensor assembly from exceeding its useable limit of performance. For example, when a thermal sensor assembly such as a thermocouple is positioned above the afterburner, a temperature reading of about 700° C. to about 1050° C. can translate to a temperature at the combustion core of the afterburner of about 900° C. to about 1250° C.

One of the features of the present teachings is an afterburner having a gradient of the amount of catalyst and/or the type of catalyst such as a combustion catalyst associated with the exposed surfaces of the non-linear or tortuous channels through which the exhaust stream(s) flow through the afterburner. For example, to reduce the temperature near the inlet face or surface and/or the outlet (face or surface) of the stack of layers, the exposed surfaces of the apertures of the inlet layer(s) and the outlet layer(s) can be associated with a reduced amount of catalyst or can contain no catalyst. Such a design can be used to shield thermally other temperature-sensitive components that may be present in thermal communication with an afterburner or be present within the afterburner such as a thermal sensor assembly (e.g., a thermocouple) thereby to reduce or avoid damage and/or degradation to such temperature-sensitive components An afterburner of the present teachings can include a housing, in which a stack of layers defining non-linear channels can be positioned or located. The housing can be adjacent to the non-inlet and non-outlet faces or surfaces of the afterburner, such as surrounding and/or encompassing the non-inlet and the non-outlet faces of the stack of layers. The housing can be a solid thermal insulation adjacent to, surrounding and/or encompassing the non-inlet and non-outlet faces or surfaces of the afterburner. The housing can be adjacent to the inlet face or surface of the stack of layers. The housing can be adjacent to the outlet face or surface of the stack of layers. Consequently, in various configurations, the housing can encompass four, five, or all for substantially all) of the faces or surfaces of the stack of layers, where fluid communication with the stack of layers is achieved with an inlet and an outlet of the afterburner and possibly other ports that provide fluid communication through the housing.

The inlet of the stack of layers of an afterburner can be designed to be in fluid communication with the exhaust outlet(s) of a fuel cell unit. Consequently, the present teachings include a fuel cell system including an afterburner as described herein; and a fuel cell stack in operable fluid communication with the inlet (face or surface) of the stack of layers and/or the inlet of the afterburner.

The inlet face or surface of the afterburner can be in thermal communication with a power conditioning component, where the power conditioning component is in electrical communication with the fuel cell stack. The power conditioning component can include a current collection plate and/or one or more bus bars.

As discussed herein, one of the features of the present teachings is an afterburner having a gradient of the amount of catalyst and/or the type of catalyst associated with the exposed surfaces of the non-linear or tortuous channels through which the exhaust stream(s) flow through the afterburner. For example, to reduce the temperature near the inlet face or surface of the stack of layers, the exposed surfaces of the apertures of the inlet layer(s) can be associated with a reduced amount of catalyst or can contain no catalyst. Such a design can be used to shield thermally other temperature-sensitive components that may be present in thermal communication with an afterburner such as a power conditioning component thereby to reduce or avoid damage and/or degradation to such temperature-sensitive components. By reducing or lowering the temperature near the inlet of an afterburner adjacent to a power conditioning component (e.g., to less than or equal to about 900° C.), different metals such as silver and copper can be used for collection and distribution of generated electricity.

A fuel cell system of the present teachings can include one or more cathode air conduits positioned in cathode air channels through the stack of layers.

Another aspect of the present teachings relates to methods of reducing contaminants or undesirable compounds from a fluid stream or mixture, for example, an exhaust stream from a fuel cell stack. Methods of the present teachings can include flowing a fluid containing contaminants through non-linear channels of an afterburner, where the afterburner includes a compressible, resilient refractory material that defines the non-linear channels from an inlet of the afterburner to an outlet of the afterburner and a combustion catalyst associated with at least a portion the exposed surfaces of the non-linear channels; and combusting, at least partially, the fluid comprising contaminants with the combustion catalyst to produce an outlet fluid stream comprising a reduced amount of contaminants compared to the fluid entering the afterburner.

In various methods, the afterburner can include a stack of layers, including compressible, resilient refractory material, where each layer defines one or more apertures through the layer. The one or more apertures of the layers, when stacked together, define the non-linear channels through the stack of layers.

In operation of a fuel cell unit or systems, the compressible, resilient refractory material at the inlet of the afterburner can become in contact with and/or can become compressed by adjacent structure of the fuel cell stack. Methods of the present teachings can include heating a cathode air stream flowing through the afterburner using the heat from combusting.

In some methods, combusting and associated heat generation can be controlled by using a gradient of the amount and/or type of combustion catalyst present in the non-linear channels. Regardless of whether a gradient is used, the afterburners of the present teachings can limit the operational temperature of the afterburner, for example, the temperature of the core of the afterburner or at a catalytic surface internal to the afterburner, to reduce vaporization of the catalyst. For example, the operational temperature of the afterburner can be less than or equal to about 1250° C., less than or equal to about 1150° C., less than or equal to about 1050° C., less than or equal to about 1000° C., less than or equal to about 950° C., or less than or equal to about 900° C.

One feature of the methods of the present teachings is that the pressure drop through the afterburner can be reduced compared to conventionally designed afterburners. For example, the afterburners of the present teachings can provide a pressure drop through the afterburner of less than or equal to about one inch of water, or less than or equal to about 0.75 inches of water, or less than or equal to about 0.5 inches of water, or less than or equal to about 0.25 inches of water.

The present teachings also provide methods of making the afterburners described herein. Such methods can include cutting at least one aperture in a layer of a compressible, resilient refractory material; repeating the cutting step to create a plurality of layers, each layer defining one or more apertures through each respective layer; associating a combustion catalyst with exposed surfaces of at least one or more of the apertures of at least one layer; stacking the plurality of layers to form non-linear channels through the stack of layers; and securing the plurality of layers to form an afterburner. In the methods of the present teachings, the combustion catalyst is associated with at least a portion of exposed surfaces of at least one of the non-linear channels through the stack of layers.

The design and placement of the apertures of each layer permits the construction of an afterburner having customized non-linear (and linear) channels therethrough for the particular application and desired characteristics of the afterburner. For example, the shape of the apertures can be circular, square, rectangular, V-shaped, C-shaped, E-shaped, etc. The placement of the apertures and their relationship to apertures of adjacent layers can be varied to create suitable non-linear (and linear) channels when stacked, for example, to form an afterburner. For example, C-shaped apertures of adjacent layers can have the ends of the "C's" line up, but be of opposite orientation in each layer such that only a small portion of the C-shaped aperture of one layer overlaps with the C-shaped aperture of the adjacent layer. A catalyst such as a combustion catalyst can be associated with the exposed surfaces of the apertures by one or more techniques as discussed herein, including spraying, printing, and a dip process.

Methods of making an afterburner of the present teachings can include applying such as wrapping a refractory material around the non-inlet and non-outlet faces or surfaces of the stack of layers. A refractory material in the form of a paper (e.g., less than or equal to about 1 mm) can be appropriate for wrapping a stack of layers. In certain embodiments, the methods of making an afterburner can include applying an adhesive material to the external surfaces of the stack of layers or to the external surfaces of the refractory material wrapped around the stack of layers.

The methods of making an afterburner can include surrounding the non-inlet and non-outlet faces or surfaces of the afterburner with a solid thermal insulation, for example, without a refractory material wrapped around the non-inlet and the non-outlet faces or surfaces of the afterburner, or adjacent to such a wrapped refractory material. The non-inlet and non-outlet faces or surfaces of the afterburner or a refractory material applied to such faces or surfaces can include an adhesive that can be adjacent to and/or in contact with the solid thermal insulation. An example of such an adhesive is a polyvinyl acetate (PVA) glue. The solid thermal insulation material can be a solid low thermal conductivity material, for example, a microporous or compressed powder insulation material such as a microporous insulation sold under the trademarks EXCELFRAX® or FIBER-FRAX® DURABOARD®, which products are available from Unifrax.

Methods of making an afterburner can include removing binders and/or organic materials, if present, from the plurality of layers. The methods can include heating the layers individually or as a stack of layers, for example, heating or firing in a furnace to burn off any binders and/or organic materials present in or associated with the layers. For example, where an adhesive is used in forming the stack of layers, the stack of layers is heated to burn off or remove the adhesive prior to use. By removing any binders and other organic materials, the porosity of the layers and consequently, the porosity of the stack of layers, can be fixed so that the porosity does not change when coupled to or integrated with the system, for example, a fuel cell unit. After the heating step to burn out any organics present, the stack of layers or individual layers usually are exposed to a reducing atmosphere such as a mixture of nitrogen and hydrogen to activate the catalyst on the exposed surfaces of the apertures or within the non-linear channels, respectively.

FIG. 1A is a schematic diagram of a perspective view of an embodiment of an afterburner of the present teachings. Referring to FIG. 1A, the afterburner 10 includes a stack of layers 12, each layer 14, 14', 14", 14'" comprising a compressible, resilient refractory material. Each layer 14, 14', 14", 14'" defines one or more apertures 16 through the layer. When stacked, the layers and their apertures define one or more non-linear channels (not seen in figures) through the stack of layers from an inlet face or side 18 of the stack of layers 12 (the under side or face or an inlet of the afterburner 10) to an outlet side 20 of the stack of layers 12 (the top side or face or an outlet of the afterburner 10).

FIG. 1A also depicts two cathode air channels 22 and two igniter and/or thermal sensor assembly cut-outs 24, i.e., an aperture that extends to the exterior edge of the afterburner to permit an igniter and/or a thermocouple to mounted therein and in thermal communication with the interior of the afterburner and in particular, the non-linear channels.

FIGS. 1B-1E are schematic diagrams of top views of individual layers of the embodiment of an afterburner as shown in FIG. 1A.

FIG. 1B is a top view of the uppermost layer of the stack of layers shown in FIG. 1A. As such, FIG. 1B represents the outlet face or side 20 of the stack of layers 12, where the apertures 16 can be considered a plurality of outlets of the stack of layers 12 or the afterburner 10. FIG. 1B also shows the cathode air channels 22, which themselves are apertures 16 in the layer 14.

FIG. 1C is a top view of the layer adjacent to the uppermost layer of the stack of layers shown in FIG. 1A. This layer 14' has one aperture 16', which aperture includes or overlaps with the cathode air channels so that the cathode air channels through this layer do not appear in their circular shape.

The aperture shown in FIG. 1C is an example of an aperture in a layer that, when stacked with other layers, defines a channel 26 that extends greater than about 50% of the length across the stack of layers in a direction perpendicular to the flow of a fluid such as a exhaust stream through the stack of layers from an inlet face of the stack of layers to an outlet face of the stack of layers. The channel 26 also extends from one side of the layer to the other side of the layer past the center line of the layer. In this embodiment, the center line is defined as running through the centers of the cathode air channels (but can be other heat-receiving or heat transfer components or structure located near the center of a layers). Where the shape of the largest surface of a layer is square or if the cathode air channels (or other heat-receiving or other structure is present near the middle of the layer) were to form a line across the shorter length of a rectangular-shaped layer, the center line can be considered as running through the centers of the cathode air channels (or other structure) to divide the layer (and consequently the stack of layers or afterburner) into two sides or halves.

FIG. 1D is a top view of an intermediary layer of the stack of layers shown in FIG. 1A. The layer 14" shows the two cathode air channels 22", which also are apertures 16", Each of the other two apertures 16" of the layer include an igniter and/or thermal sensor assembly cut-out 24, which layer, when stacked with other layers, connects the interior of the stack of layers to the exterior of the stack of layers. That is, the aperture including a cut-out of this layer, when stacked with other layers, forms a channel in thermal communication with an igniter and/or thermal sensor assembly, when present. When an igniter is present in the cut-out, this layer usually contains a catalyst such as a combustion catalyst associated with exposed surfaces of the aperture such that, when stacked with other layers, the catalyst is associated with exposed surfaces of a non-linear channel and is in thermal communication with the igniter to permit ignition of the combustion reaction in the channel.

The cut-out of the aperture permits an igniter or a thermal sensor assembly such as a thermocouple to extend into the channel formed by the stacked layers, but without being in direct contact with the catalyst and the "hot spots" associated with the combustion reaction(s). For example, as shown in FIG. 1D, a sub-channel (or chamber) 28 is present without jagged edges immediately adjacent to the cut-out 24 and periphery of the layer such that no catalyst can be associated with this sub-channel to shield the igniter and/or the thermal sensor assembly. The igniter and/or thermal sensor assembly can be positioned and kept in place with a variety of structure and in a variety of ways, for example, by insertion through the outside of a solid thermal insulation or unit or system package housing adjacent to the face or side of the stack of layers where the cut-out is present.

The two larger apertures with the cut-outs also include exposed surfaces along their edges that provide an increased amount of surface area, with which a catalyst can be associated. As shown, not only is the perimeter or length of the exposed surfaces longer than the perimeter or length of the exposed surfaces of the apertures of the layer of FIG. 1B, but the exposed surfaces also have a jagged or zigzag pattern, rather than a linear design to further increase the surface area of the exposed surfaces of this layer.

FIG. 1E is a top view of the bottom layer of the stack of layers shown in FIG. 1A. As such, the underside of the layer 14''' represents the inlet lace or side 18 of the stack of layers 12 (the under side or face or an inlet of the afterburner 10). The layer 14''' has two circular apertures 16''' that define the two cathode air channels 22'''. The layer 14''' also has two rectangular apertures 16'– that define inlets to the stack of layers 12 and afterburner 10, where the rectangular apertures can interface with adjacent structure, such as outlets of a fuel cell stack.

When stacked with an adjacent layer, the channel 30 formed by the rectangular aperture 16''' can be considered to extend greater than about 50% of the length across the stack of layers in a direction perpendicular to the flow of a fluid stream through the stack of layers from the inlet face to the outlet face. However, unlike the channel 26 in FIG. 1C, the channel 30 in FIG. 1E does not extend past the center line of the layer from one side of the layer to the other side of the layer hut rather, is considered to extend only within one side of the layer.

Figures 2A, 2B, 2C, 2D:
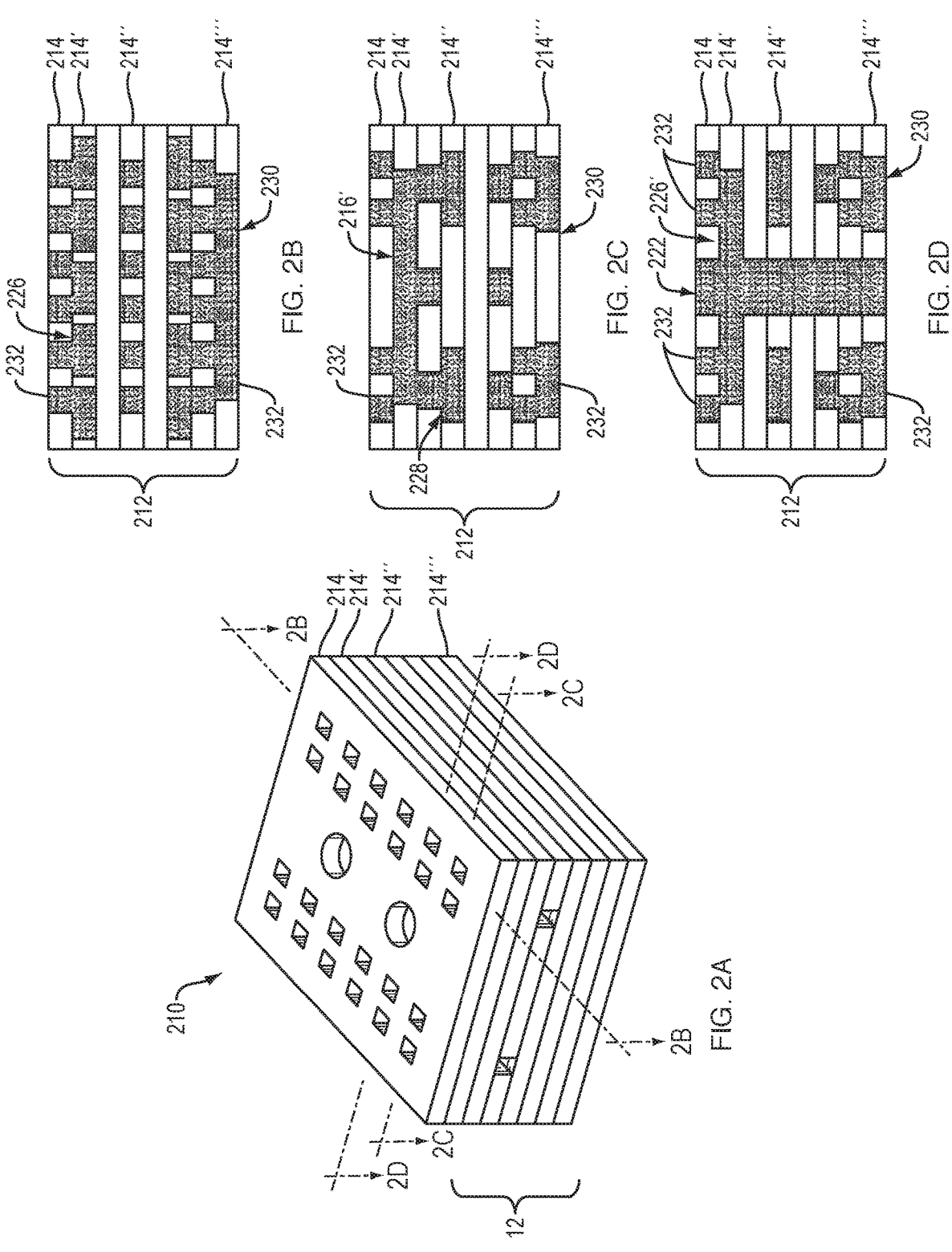
FIG. 2A is a schematic diagram of a perspective view of an embodiment of an afterburner of the present teachings, similar to the embodiment shown in FIG. 1A.
FIG. 2B is a schematic diagram of a cross-sectional view of the embodiment of FIG. 2A, where the cross-section is a vertical plane along or through line 2B-2B.
FIG. 2C is a schematic diagram of a cross-sectional view of the embodiment of FIG. 2A, where the cross-section is a vertical plane along or through line 2C-2C.
FIG. 2D is a schematic diagram of a cross-sectional view of the embodiment of FIG. 2A, where the cross-section is a vertical plane along or through line 2D-2D.

FIG. 2A is a schematic diagram of a perspective view of an embodiment of an afterburner of the present teachings, similar to the embodiment shown in FIG. 1A. In particular, FIG. 2A shows an afterburner 210 including a stack of layers 212, which includes individual layers 214, 214', 214", 214'''. FIGS. 2A-2B are provided to show the non-linear channels created by the stack of layers, viewed looking at different planes through the stack of layers. The similar components of figures can be the same or different, for example, having various modifications associated therewith such as materials of construction, sensor assemblies, valve configurations, conduit connections and arrangement, and the like.

More specifically, FIG. 2B is a schematic diagram of a cross-sectional view of the embodiment of FIG. 2A, where the cross-section is a vertical plane along or through line 2B-2B. As can be seen in FIG. 2B, the stack of layers 212 includes layers 214, 214', 214", 214''', where the darkened square and rectangular shapes are non-linear channels 232 present in and through the stack of layers 212.

The second layer from the top 214' shows a channel 226 (similar to the channel 26 of FIG. 1C). Although not seen in this lateral cross-sectional view, the channel extends greater than about 50% of the length across the stack of layers in a direction perpendicular to the flow of a fluid through the stack of layers and that also extends from one side of the layer to the other side of the layer past the center line of the layer.

The bottom layer 214''' shows the length of the channel 230 (similar to the channel 30 of FIG. 1E) that extends greater than about 50% of the length across the stack of layers in a direction perpendicular to the flow of a fluid through the stack of layers but that does not extend past the center line of the layer. As can be seen in this cross-section of the stack of layers, a linear channel is not present through the stack of layers from the inlet face or side of the stack of layers to the outlet face or side of the stack of layers but rather a network of non-linear channels are present that run up, down and across from the inlet face or side of the stack of layers to the outlet face or side of the stack of layers.

FIG. 2C is a schematic diagram of a cross-sectional view of the embodiment of FIG. 2A, where the cross-section is a vertical plane along or through line 2C-2C. As can be seen in FIG. 2C, the stack of layers 212 includes layers 214, 214', 214", 214''', where the darkened square and rectangular shapes are non-linear channels 232 present in and through the stack of layers 212.

The second layer from the top 214' shows a channel formed by aperture 216', similar to the channel to the left of channel 26 of FIG. 1C. The channel formed by the aperture 216' extends greater than about 50% of the length across the stack of layers in a direction perpendicular to the flow of a fluid through the stack of layers and from one side of the layer to the other side of the layer past the center line of the layer (where the lead line from reference number 216' points to about the center line of the layer, which center line coincides with a line through the cathode air channels.

The fourth layer from the top 214" shows the sub-channel (or chamber) 228, similar to the sub-channel channel (or chamber) 28 in FIG. 1D.

The bottom layer 214''' shows the channel 230, similar to the channel 30 of FIG. 1E, but in cross-section so its length across the stack of layers is not seen in this view.

As can be seen in the cross-section of the stack of layers in FIG. 2C, a linear channel, is not present through the stack of layers from the inlet face or side of the stack of layers to the outlet face or side of the stack of layers but rather a network of non-linear channels are present that run up, down and across from the inlet face or side of the stack of layers to the outlet face or side of the stack of layers.

FIG. 2D is a schematic diagram of a cross-sectional view of the embodiment of FIG. 2A, where the cross-section is a vertical plane along or through line 2D-2D. As can be seen in FIG. 2D, the stack of layers 212 includes layers 214, 214',

214", 214''', where the darkened square and rectangular shapes are non-linear channels 232 present in and through the stack of layers 212.

The top layer 214 shows the second of the two rectangular non-linear channels 232 on opposing sides of the outlet face or side of the stack of layers. The top layer also shows an outlet of a cathode air channel 222, which cathode air channel forms a linear channel through the stack of layers from the inlet face or side of the stack of layers to the outlet face or side of the stack of layers. Despite, the presence of one or more linear channels through a stack of layers, the afterburners of the present teachings require the presence of one or more non-linear channels through the stack of layers.

The second layer from the top 214' shows a channel 226' (similar to the channel 26 of FIG. 1C) that extends greater than about 50% of the length across the stack of layers in a direction perpendicular to the flow of a fluid through the stack of layers and that also extends from one side of the layer to the other side of the layer past the center line of the layer.

The bottom layer 214''' shows the channel 230, which also is a non-linear channel 232 similar to the channel 30 of FIG. 1E, but in cross-section so its length across the stack of layers is not seen in this view.

Figure 3A:
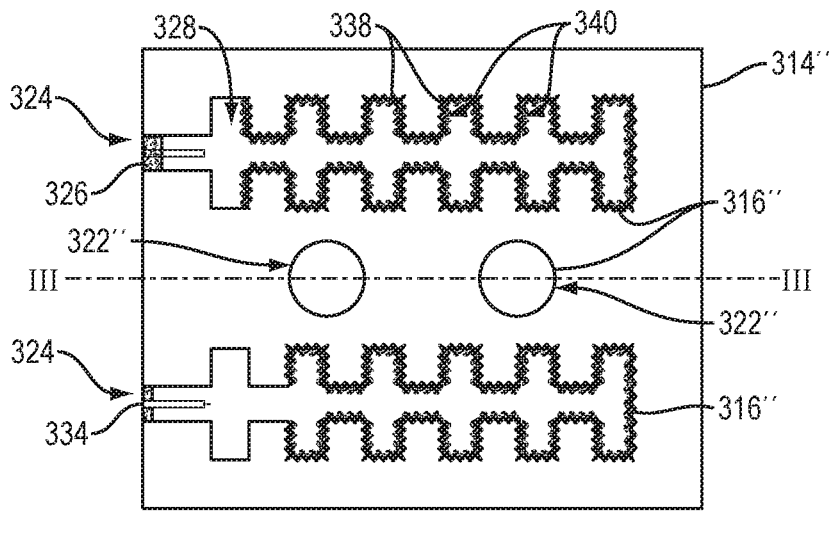
FIGS. 3A and 3B are a schematic diagrams of top views of embodiments of layers of a refractory material, each of which can be one layer of a stack of layers that form at least a portion of an afterburner of the present teachings.

FIG. 3A is a schematic diagram of a top view of a layer of a refractory material, which layer can be one layer of a stack of layers that form at least a portion of an afterburner of the present teachings. The layer 314" is similar to layer 14" of FIG. 1D including two cathode air channels 322", which also are apertures 316". However, the layer 314" also includes a thermal sensor assembly 334 in an aperture cut-out 324 and an igniter 336 in another aperture cut-out 324.

As previously stated, the cut-out of the aperture permits the igniter and the thermal sensor assembly such as a thermocouple to extend into the channel formed by the stacked layers, but without being in direct contact with a catalyst and the "hot spots" associated with the combustion reaction(s) catalyzed thereby.

For example, as shown in FIG. 3A, a sub-channel (or chamber) 328 is present without catalyst (represented by the dotted or porous layer adjacent to the jagged edges) immediately adjacent to the igniter 336 to shield the igniter from the heat of combustion. The thermal sensor assembly 334 is similarly positioned in a respective catalyst-free sub-channel (or chamber) opposite the center line of the layer formed by line III-III, which catalyst-free area or volume extends further into the aperture or channel.

The two large apertures 316" including the igniter 336 and the thermal sensor assembly 334, respectively, include exposed surfaces 338 at the edges of their respectively patterned shape. The depicted exposed surfaces 338, which have a non-linear edge that increases the surface area of the exposed surfaces of this layer, have a catalyst 340 associated therewith as described herein.

Figure 3B:
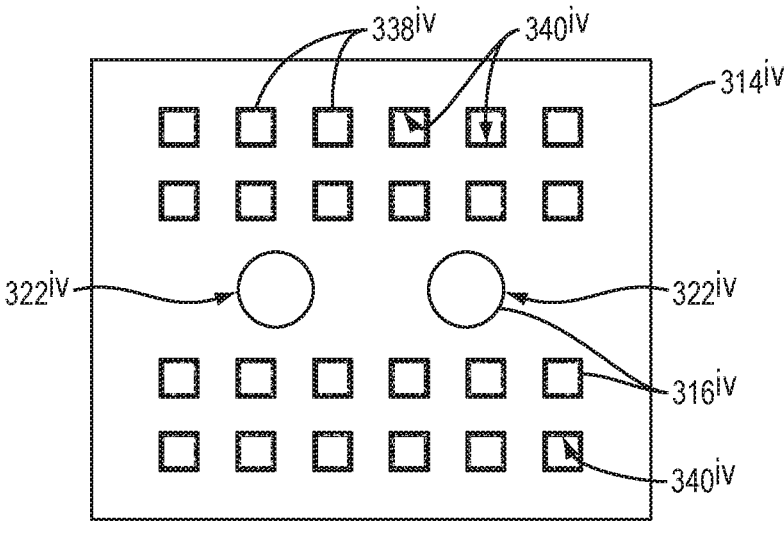

FIG. 3B is a schematic diagram of a top view of a layer of a refractory material, which layer can be one layer of a stack of layers that form at least a portion of an afterburner of the present teachings. Although the layer 314$^{iv}$ appears similar to layer 14 of FIG. 1B, the exposed surfaces 338$^{iv}$ of the quadrilateral-shaped apertures 316$^{iv}$ of the layer include a catalyst 340$^{iv}$. With a low amount of catalyst loading (or no catalyst present), the layer can be positioned so that it is an outer layer of the stack of layers so that one of its largest surfaces defines an outlet face or surface of the stack of layers (as does layer 14 in FIGS. 1A and 1B). However, the layer 314$^{iv}$ could be positioned as an internal layer to the stack of layers, especially where the amount of catalyst loading is increased compared to and/or the type of catalyst is different than what typically would be present at an inlet or an outlet of an afterburner. The layer 314$^{iv}$ also includes two cathode air channels 322$^{iv}$, which can be considered to be apertures 316$^{iv}$.

Figure 4:
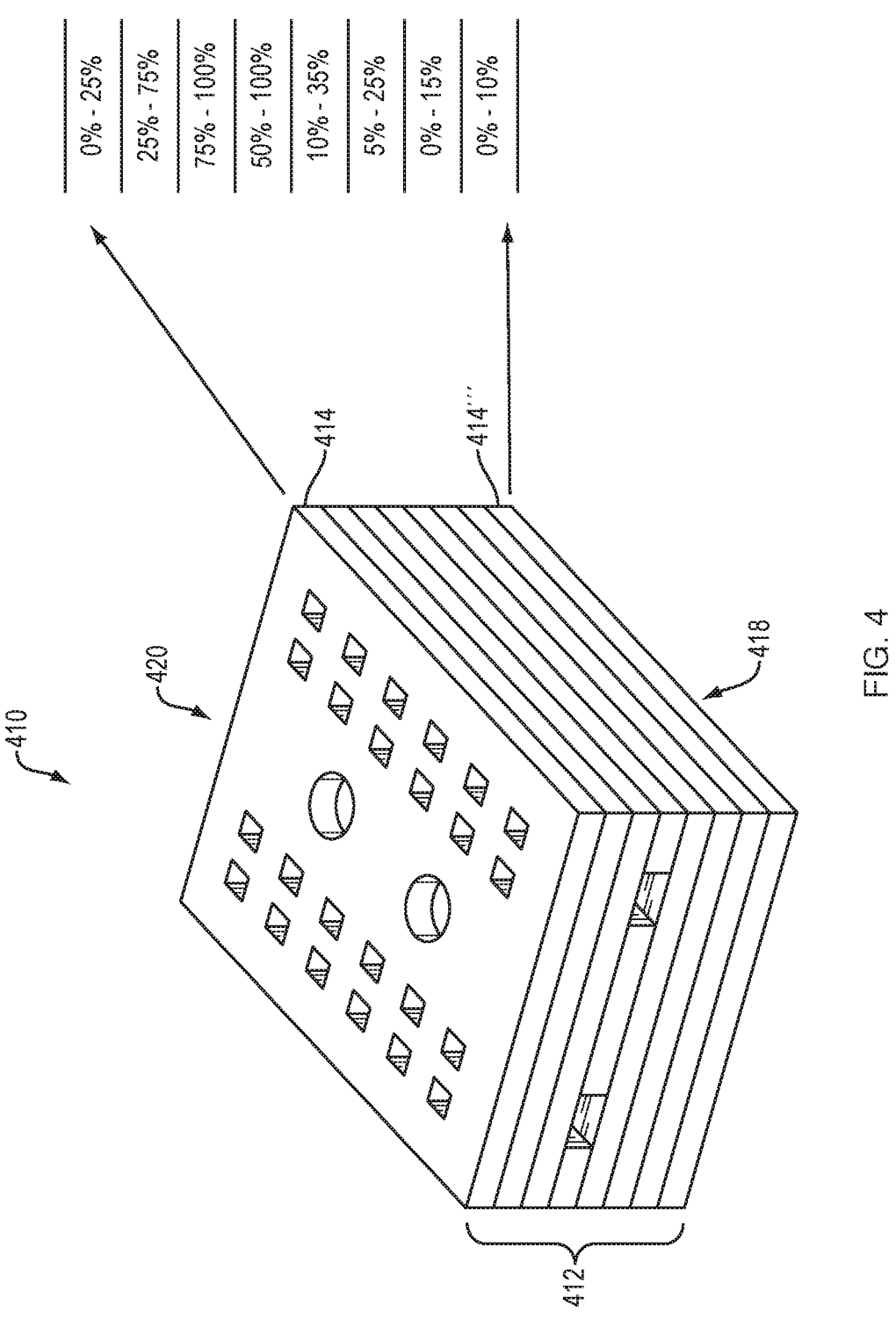
FIG. 4 is a schematic diagram of a perspective view of an embodiment of an afterburner of the present teachings where an exemplary amount of catalyst loading present in each layer of the stack of layers is indicated.

FIG. 4 a schematic diagram of a perspective view of an embodiment of an afterburner of the present teachings where an exemplary amount of catalyst loading present in each layer of the stack of layers 412 is indicated to the right of the afterburner. As can be seen, the ranges of catalyst loading (e.g., coverage of surface area of the measurable exposed surfaces with catalyst) of the respective layers form an increasing gradient from the layer 414''' at the bottom, a surface of which is the inlet face or side 418 of the stack of layers, to the intermediary and upper layers of the stack of layers, and then a decreasing gradient towards the layer 414 at the top, a surface of which is the outlet face or side 420 of the stack of layers.

In particular, the layer at the bottom and the adjacent layer can be devoid of catalyst, i.e., contain no catalyst. With such a design, the operating temperature of the afterburner can be reduced at its inlet to avoid thermal issues with adjoining components. In addition, these two layers can be designed to act as a manifold to collect, mix, and/or distribute incoming exhaust streams including unspent reformable fuel to provide a more uniform composition for the catalytic combustion reaction further upstream in the non-linear channels of the afterburner.

A similar situation exists near the outlet of the stack of layers, where high operating temperatures can be avoided by reducing the amount of catalyst loading in a decreasing gradient toward the outlet face or side of the stack of layers. Indeed, in certain cases, the last layer can be devoid of catalyst. Consequently, the temperature of the exhaust from the afterburner can be reduced. Subsequently, the exhaust stream can be delivered to heat recovery components and/or devices or expelled as waste heat.

For example, combining the above concepts, the first layers can be devoid of catalyst and used to mix the unreacted fuel, exhaust and air prior to contact with a catalyst. As this reactants mixture moves through the non-linear channels of the afterburner and comes into contact with a catalyst, a combustion reaction can begin to convert the reactants into combustion products. As the mixture continues through the non-linear channels, it encounters additional catalyst loading and a higher temperature reaction zone near the center or downstream half of the afterburner, where most of the combustion and conversion can take place. Next, when only a small amount of fuel and reactants remain in the mixture and larger amounts of oxygen are needed for combustion, the further downstream sections of the non-linear channels can include a larger surface area and/or a more reactive catalyst to complete the combustion process. Finally, the exhaust stream can pass through the final layer(s) of the stack of layers, which final layer(s) can be devoid of catalyst, thereby reducing or lowering the temperature of the exhaust stream from the afterburner.

As should be understood, the number of layers in a stack of layers and the thickness of each layer can determine the slope of the gradient and placement of catalyst. That is, with a layer of a refractory material in the form of a paper, the number of layers typically would be greater than if the layers were in the form of a felt or other form thicker than paper, where felts and other forms can have a thickness ranging from about 1 mm to about 10 mm, from about 2 mm to about 7 mm, from about 3 mm to about 5 mm, or about 3 mm to about 4 mm. With a larger number of layers forming the stack of layers of an afterburner, more layers at the inlet side and/or outlet side of the stack of layers can be de void of catalyst and/or the slope of the gradient of the amount and/or type of catalyst along the exposed surfaces of the non-linear channels ears increase or decrease more gradually. Of course a stack of layers can be created from different forms of compressible, resilient refractory materials such as a paper and a felt for further control of the final stack of layers and catalyst associated with the exposed surfaces of the non-linear channels.

Figure 5:
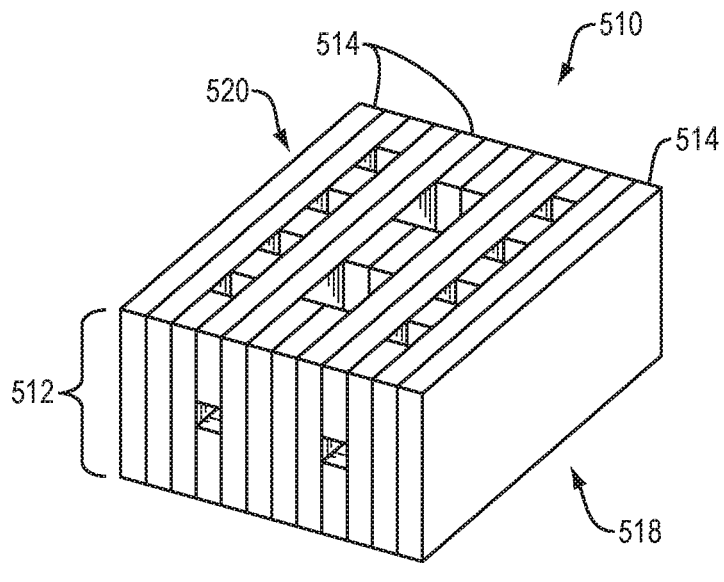
FIG. 5 is a schematic diagram of a perspective view of an embodiment of an afterburner of the present teachings where the edges of the layers of the stack of layers are oriented at an angle of 90° in comparison to the stack of layers of FIG. 1A.

FIG. 5 a schematic diagram of a perspective view of an embodiment of an afterburner of the present teachings where the edges of the layers of the stack of layers are oriented at an angle of 90° in comparison to the stack of layers of FIG. 1A. More specifically, the afterburner 510 includes a stack of layers 512, including individual layers 514, where the edges rather than the larger (planar) surface area faces or surfaces define the inlet face or side 518 of the stack of layers and the edges on the opposite side define the outlet face or side 520 of the stack of layers.

Figure 6:
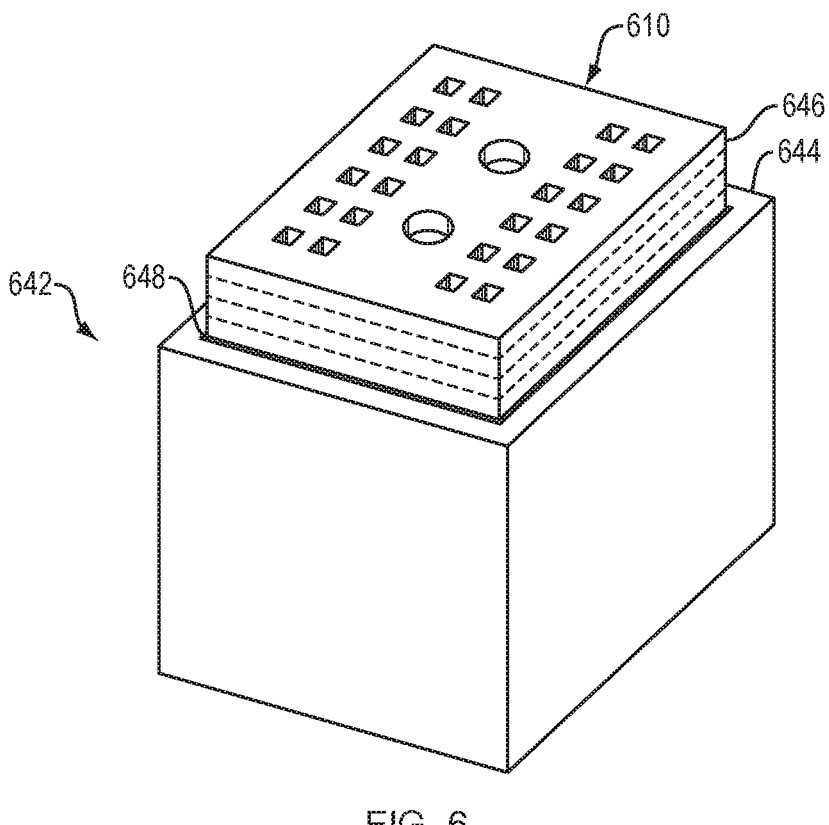
FIG. 6 is a schematic diagram of a perspective view of an embodiment of an afterburner of the present teachings being positioned within a housing of a sol id thermal insulation on the non-inlet and non-outlet faces or surfaces of the afterburner.

FIG. 6 is a schematic diagram of a perspective view of an embodiment of an afterburner 610 positioned within a housing 642 of a solid thermal insulation 644 on the non-inlet and non-outlet faces or surfaces of the afterburner. The depicted afterburner 610 is wrapped with a refractory material. 646, for example, a refractory paper, which can help to secure the stack of layers. As shown in this figure, the wrapped stack of layers fits slidably within the housing but is not tightly-fitted or friction-fit as a slight gap exists. In such a configuration, the wrapped stack of layers can be supported on its bottom or inlet face or side by the underlying components to which its coupled or connected. As such, in certain embodiments, a stack of layers or a wrapped stack, of layers can be considered to be supported by adjacent structure and/or components. For example, the stack of layers or the wrapped stack, of layers can be considered to "sit" on adjacent structure and in some cases, can be considered to "float in place" during operation.

Figure 7A:
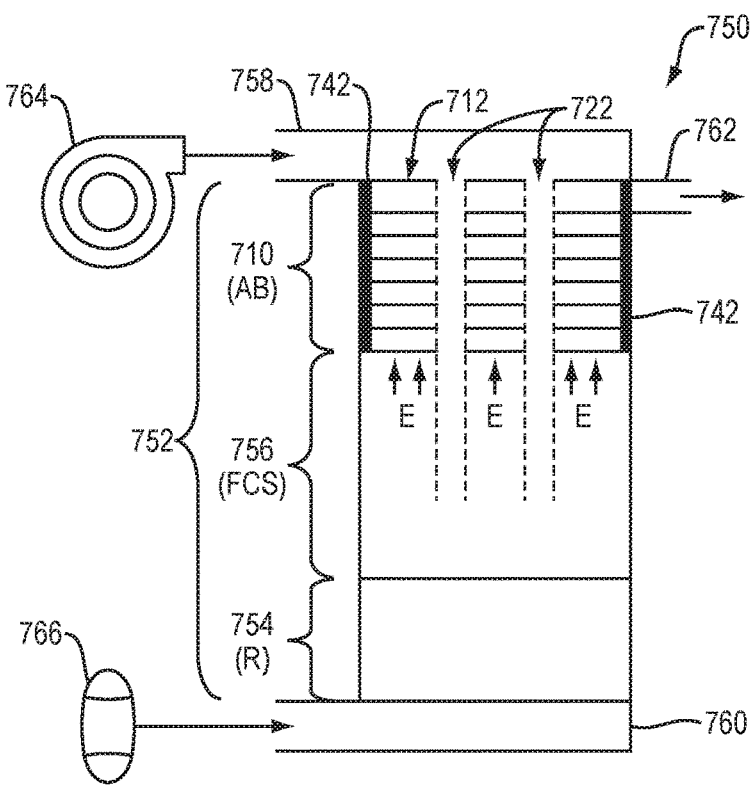
FIGS. 7A and 7B are schematic diagrams of side cross-sectional views of embodiments of a fuel cell system including a fuel cell unit containing an afterburner of the present teachings.
Figure 7B:
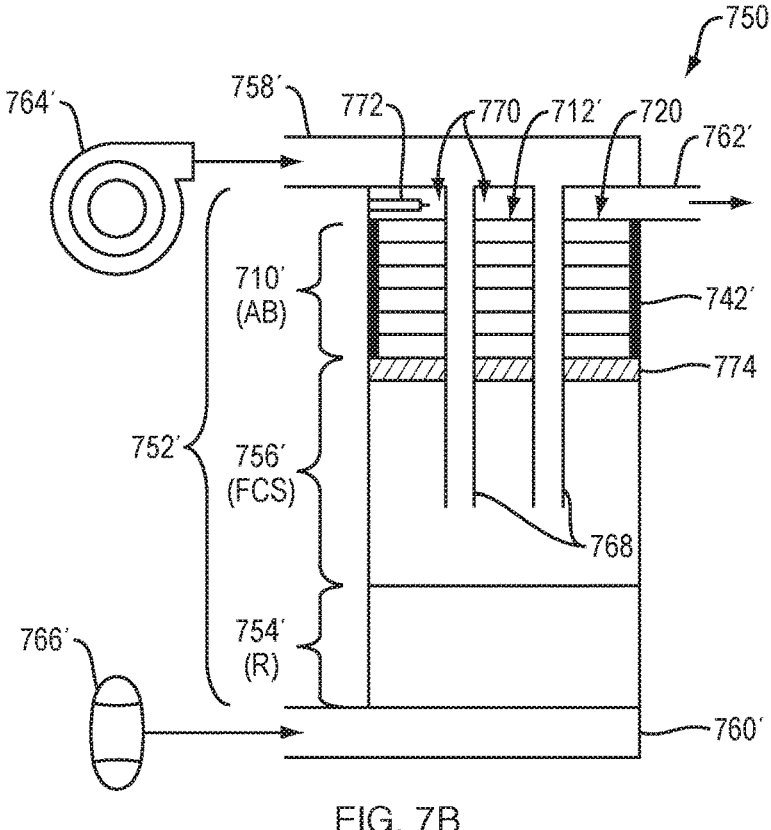

FIGS. 7A and 7B are schematic diagrams of side cross-sectional views of embodiments of a fuel cell system including a fuel cell unit containing an afterburner of the present teachings.

Referring to FIG. 7A, the fuel cell system 750 includes a fuel cell unit 752, which includes a reformer 754, a fuel cell stack 756, and an afterburner 710. The fuel cell system 750 or fuel cell unit 752 includes two cathode air channels 722 shown in dashed lines through the stack of layers 712, which form the non-linear channels (not shown). Each of the cathode air channels 722 can include a cathode air conduit that can extend into the fuel cell stack 756 (as shown by the dashed lines).

The fuel cell system 750 includes a cathode air delivery conduit 758 for delivering cathode oxygen-containing gas (e.g., air) through the afterburner 710 to a cathode (not shown) of the fuel cell stack 756. The fuel cell system 750 also include an anode reactants delivery conduit 760 for delivering one or more of anode air, an oxidant, and reformable fuel to the reformer 754. The fuel cell system 750 or the fuel cell unit 752 includes an afterburner exhaust conduit 762 for exhausting heated fluids such as heated afterburner combustion products from the afterburner 710. The fuel cell system 750 includes a source of oxygen-containing gas 764 in operable fluid communication with the cathode air delivery conduit 758. The fuel cell system 750 also includes a source of a reformable fuel 766 in operable fluid communication with the anode reactants delivery conduit 760.

With respect to the afterburner shown in FIG. 7A, the afterburner 710 includes a housing 742 that encompasses or surrounds substantially the non-inlet and the non-outlet faces or surfaces of the stack of layers 712. The housing can be a solid thermal insulation. As shown in FIG. 7A, the afterburner exhaust conduit 762 exits the afterburner 710 through the housing 742 at a face or side of the stack of layers near its top but not at its top face or surface (as defined by the general direction of flow of exhaust through the stack of layers from an inlet face or side near the arrows emanating from the "E's" to the opposite face or surface of the stack of layers).

FIG. 7A also shows the linear expansion that a fuel cell stack and/or other components of the fuel cell unit and/or system can undergo during operation such that the fuel cell stack can expand or can be moved in the direction of the arrows emanating from the "E's." As discussed herein, the compressible nature of the stack of layers of the afterburner of the present teachings can accommodate the expansion and minimize the structural stress on the fuel cell stack, the fuel cell unit, and the fuel cell system.

Referring to FIG. 7B, the fuel cell system 750', which is similar to the fuel cell system in FIG. 7A, includes a fuel cell unit 752', which includes a reformer 754', a fuel cell stack 786', and an afterburner 710'. The fuel cell system 750' or fuel cell unit 752" includes two cathode air conduits 768 through the stack of layers 712', which stack of layers form the non-linear channels (not shown). Each of the cathode air conduits 768 extends into the fuel cell stack 756 and is in operable fluid communication with a cathode air delivery conduit 758'. The fuel cell system 750' includes a source of oxygen-containing gas 764' in operable fluid communication with the cathode air delivery conduit 758'.

The fuel cell system 750' includes an anode reactants delivery conduit 760' for delivering one or more of anode air, an oxidant, and reformable fuel to the reformer 754'. The fuel cell system 750' also includes a source of a reformable fuel 766' in operable fluid communication with the anode reactants delivery conduit 760'.

The afterburner 710' shown in FIG. 7B includes a housing 742' that encompasses or surrounds the non-inlet and the non-outlet faces or surfaces of the stack of layers 712'. In operation as shown, the fluid stream or exhaust from the stack of layers 712' exits its top face or surface, i.e., the outlet face or surface 720, of the stack of layers into an exhaust chamber 770. The exhaust chamber is formed by the outlet face or surface of the stack of layers and the cathode air delivery conduit and other structure associated with the top of the fuel cell unit package. As such, the fluid stream or exhaust from the afterburner is directed out of the fuel cell unit through the afterburner exhaust conduit 762', which is in fluid communication with the exhaust chamber 770 and the outlet face or surface of the stack of layers 720. The exhaust chamber cars include structure and/or components to assist in directing or facilitate the removal of the exhaust stream from the stack of layers through the afterburner exhaust conduit.

In the configuration shown in FIG. 7B, the exhaust chamber 770 above the stack of layers and in fluid communication with the outlets of the stack of layers includes a thermal sensor assembly 112. The thermal sensor assembly, which can be a thermocouple, is positioned above the stack of layers and monitors the temperature of the fluid stream or exhaust from the stack of layers. Although the temperature above the stack of layers will be lower than the temperature of the combustion reactions occurring within the non-linear channels within the stack of layers, a temperature relationship can be determined (e.g., measured) between the exhaust stream and the "hot spot" of the combustion reactions such that the internal temperature of the stack of layers can be estimated based on the temperature measured at the outlet face of the stack of layers by the thermal sensor assembly 772.

FIG. 7B also depicts one or more power conditioning components 774 adjacent to the inlet face or surface of the stack of layers 712' or the afterburner 710'. As shown, the power conditioning component(s) 774 such a current collection plate and/or one or more bus bars are located close to the fuel cell stack 756' where the electricity is generated. To reduce the exposure of the power conditioning component(s) the high operating temperature of the fuel cell stack and the afterburner, the afterburner can include little or no combustion catalyst in the first layer(s) of the stack of layers of the afterburner to maintain or reduce the temperature of combustion in the afterburner near its inlet face or surface. Although the temperature of the exhaust from the fuel cell stack can, be high, by designing an afterburner with high catalyst loading mainly in its interior, and in particular, with an amount of catalyst as an increasing gradient after a section devoid of catalyst, the power conditioning component(s) can experience a reduced temperature zone between the fuel cell stack and the afterburner.

The present teachings encompass embodiments in other specific forms without departing from the spirit or essential characteristics thereof. The foregoing embodiments are therefore to be considered in all respects illustrative rather than limiting on the present teachings described herein. Scope of the present invention is thus indicated by the appended claims rather than by the foregoing description, and all changes that come within the meaning and range of equivalency of the claims are intended to be embraced therein.

What is claimed is:

1. A fuel cell unit comprising:
an afterburner, the afterburner comprising:
a stack of layers, wherein each layer is a compressible, resilient refractory material comprising fibers of silica, alumina or silica-alumina mixtures and defines one or more apertures fully through the layer in a direction of a flow of exhaust from an inlet face to an outlet of the stack of layers, wherein the one or more apertures of the stack of layers define non-linear channels through the stack of layers from the inlet face to the outlet of the stack of layers, wherein the non-linear channels comprise channels perpendicular to a flow of exhaust from the inlet face to the outlet of the stack of layers, each channel perpendicular to the flow of exhaust is defined by an aperture through a corresponding layer, which aperture extends greater than 50% of a length across the stack of layers in a direction perpendicular to the direction of flow of exhaust from the inlet face to the outlet of the stack of layers and which aperture extends fully through the corresponding layer in the direction of flow of exhaust from the inlet face to the outlet of the stack of layers; and the stack of layers remains compressible and resilient; and
a combustion catalyst associated with exposed surfaces of the one or more apertures of at least one layer of the stack of layers such that the combustion catalyst is associated with an exposed surface of a non-linear channel; and
a fuel cell stack in operable fluid communication with the inlet face of the stack of layers.

2. The fuel cell unit of claim 1, wherein the amount of combustion catalyst associated with the exposed surface of a non-linear channel comprises a gradient.

3. The fuel cell unit of claim 2, wherein the gradient comprises an increase in the amount of combustion catalyst present from the inlet face of the stack of layers to the outlet of the stack of layers.

4. The fuel cell unit of claim 3, wherein a second gradient is present, wherein the second gradient comprises a decrease in the amount of combustion catalyst present after the increasing gradient and towards the outlet of the stack of layers.

5. The fuel cell unit of claim 1, wherein the exposed surfaces of the one or more apertures of the layer of the stack of layers closest to an inlet of the afterburner and/or the one or more apertures of the layer of the stack of layers closest to an outlet of the afterburner do not comprise a combustion catalyst.

6. The fuel cell unit of claim 1, wherein the exposed surfaces of the one or more apertures of one or more layers of the stack of layers away from an inlet and an outlet of the afterburner comprise a combustion catalyst and an increased surface area compared to the exposed surfaces of the one or more apertures of layers of the stack of layers closest to the inlet and the outlet of the afterburner.

7. The fuel cell unit of claim 6, wherein at least one of the layers of the one or more layers of the stack of layers away from the inlet and the outlet of the afterburner comprising a combustion catalyst and an increased surface area comprises one or more apertures designed to mount an igniter and/or a thermal sensor assembly.

8. The fuel cell unit of claim 7, comprising an igniter, the igniter in operable thermal communication with the combustion catalyst.

9. The fuel cell unit of claim 7, comprising a thermal sensor assembly, the thermal sensor assembly in thermal communication with one or more non-linear channels comprising a combustion catalyst.

10. The fuel cell unit of claim 1, comprising an igniter, the igniter in operable thermal communication with the combustion catalyst.

11. The fuel cell unit of claim 1, comprising a thermal sensor assembly, the thermal sensor assembly in thermal communication with one or more non-linear channels comprising a combustion catalyst.

12. The fuel cell unit of claim 1, wherein the inlet of the stack of layers is in thermal communication with a power conditioning component, the power conditioning component being in electrical communication with the fuel cell stack.

13. The fuel cell unit of claim 1, wherein the fibers of silica, alumina or silica-alumina mixtures are in the form of a paper, a felt, a mat, or a blanket.

14. The fuel cell unit of claim 1, wherein the fibers of silica, alumina or silica-alumina mixtures are in the form of a continuous strand mat, a chopped mat, or woven or knit cloth.

15. A fuel cell unit comprising:
an afterburner, the afterburner comprising:
a contiguous stack of layers, wherein each layer is a compressible, resilient refractory material comprising fibers of silica, alumina or silica-alumina mixtures, and defines one or more apertures fully through the layer in a direction of a flow of exhaust from an inlet face to an outlet of the contiguous stack of layers, wherein the fibers of silica, alumina or silica-alumina mixtures are in the form of a continuous strand mat, a chopped mat, or woven or knit cloth, and the one or more apertures of the contiguous stack of layers define non-linear channels through the contiguous stack of layers from an inlet face to an outlet of the contiguous stack of layers, wherein the non-linear channels comprise channels perpendicular to a flow of exhaust from the inlet face to the outlet of the contiguous stack of layers and channels perpendicular to the flow of exhaust are defined by one or more apertures fully through a corresponding layer in a direction of the flow of exhaust from the inlet face to the outlet of the contiguous stack of layers, which one or more apertures extends greater than 50% of the length across the contiguous stack of layers in a direction perpendicular to the direction of the flow of exhaust from the inlet face to the outlet of the contiguous stack of layers, and the contiguous stack of layers remains compressible and resilient; and a combustion catalyst associated with exposed surfaces of the one or more apertures of at least one layer of the contiguous stack of layers such that the combustion catalyst is associated with an exposed surface of a non-linear channel; and a fuel cell stack in operable fluid communication with the inlet face of the contiguous stack of layers.

16. The fuel cell unit of claim 15, wherein the amount of combustion catalyst associated with the exposed surface of a non-linear channel comprises a gradient.

*   *   *   *   *